US009323418B2

(12) United States Patent
DiVita et al.

(10) Patent No.: US 9,323,418 B2
(45) Date of Patent: Apr. 26, 2016

(54) METHOD FOR ANALYZING GUI DESIGN AFFORDANCES

(71) Applicants: Joseph C. DiVita, Carlsbad, CA (US); Robert L. Morris, San Diego, CA (US)

(72) Inventors: Joseph C. DiVita, Carlsbad, CA (US); Robert L. Morris, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 389 days.

(21) Appl. No.: 14/075,374

(22) Filed: Nov. 8, 2013

(65) Prior Publication Data

US 2014/0068470 A1 Mar. 6, 2014

Related U.S. Application Data

(63) Continuation-in-part of application No. 13/097,969, filed on Apr. 29, 2011, now abandoned.

(51) Int. Cl.
*G06F 3/048* (2013.01)
*G06F 11/36* (2006.01)
*G06F 9/44* (2006.01)
*G06F 3/0481* (2013.01)

(52) U.S. Cl.
CPC ................ *G06F 3/0481* (2013.01); *G06F 8/36* (2013.01); *G06F 8/38* (2013.01); *G06F 11/3608* (2013.01)

(58) Field of Classification Search
None
See application file for complete search history.

(56) References Cited

U.S. PATENT DOCUMENTS

| 5,335,320 | A  | * | 8/1994  | Iwata .......................... G06F 8/38 717/108 |
| 5,408,603 | A  | * | 4/1995  | Van de Lavoir ....... G06F 9/4443 704/9 |
| 5,801,958 | A  | * | 9/1998  | Dangelo .......... G01R 31/31704 716/102 |
| 6,427,230 | B1 | * | 7/2002  | Goiffon ..................... G06F 8/36 717/108 |
| 6,976,218 | B2 | * | 12/2005 | Stanford-Clark ......... G06F 8/38 709/223 |
| 7,350,190 | B2 | * | 3/2008  | Torres ................... G06F 9/4443 706/11 |
| 7,870,512 | B2 | * | 1/2011  | Misovski .................. G06F 8/38 706/52 |
| 7,975,239 | B2 | * | 7/2011  | Bellotti .................. G06Q 10/06 715/739 |
| 8,209,201 | B1 | * | 6/2012  | Yuasa .................. G06Q 10/063 705/301 |
| 8,464,204 | B1 | * | 6/2013  | Thornton ............ G06F 11/3608 717/100 |
| 8,924,871 | B2 | * | 12/2014 | Ikegami .............. G06F 11/3692 715/764 |

(Continued)

OTHER PUBLICATIONS

Davita et al. Rapid, Agile Modeling Support for Human-Computer Interface Conceptual Design. Spawar Technical Report 1976. Dec. 2008. 41 pages.*

(Continued)

*Primary Examiner* — Amy M Levy
(74) *Attorney, Agent, or Firm* — SPAWAR Systems Center Pacific; Kyle Eppele; J. Eric Anderson

(57) ABSTRACT

A method for analysis of a prototype graphical user interface (GUI) comprising the following steps: receiving, with a processor, a computer code representative of the prototype GUI, wherein the prototype GUI comprises GUI elements having known identities and known behavioral attributes; transforming the computer code into a description of visible sub-elements of the prototype GUI elements, wherein each sub-element has visual properties that would be visible to a user of the prototype GUI; grouping particular visible sub-elements into a perceived GUI element based only on the sub-elements' visual properties according to a grouping algorithm without regard to the known identity(ies) of the prototype GUI element(s) to which the particular sub-elements belong; and storing, in a non-transitory first memory store, the perceived GUI element.

8 Claims, 23 Drawing Sheets

(56) References Cited

U.S. PATENT DOCUMENTS

| | | | | |
|---|---|---|---|---|
| 2002/0097253 | A1* | 7/2002 | Charisius | G06F 8/20 715/700 |
| 2002/0122047 | A1* | 9/2002 | Dewa | G06F 9/4443 345/649 |
| 2003/0033038 | A1* | 2/2003 | Paris | G06F 8/36 700/90 |
| 2003/0237026 | A1* | 12/2003 | Petersen | G06F 8/34 714/38.1 |
| 2004/0153992 | A1* | 8/2004 | Molina-Moreno | G06F 8/35 717/105 |
| 2004/0154000 | A1* | 8/2004 | Kasravi | G06F 11/3608 717/130 |
| 2006/0271856 | A1* | 11/2006 | Raymond | G06F 8/38 715/730 |
| 2007/0150805 | A1* | 6/2007 | Misovski | G06F 8/38 715/234 |
| 2007/0162874 | A1* | 7/2007 | Lauff | G06F 8/38 715/762 |
| 2007/0220342 | A1* | 9/2007 | Vieira | G06F 11/3688 714/33 |
| 2007/0250497 | A1* | 10/2007 | Mansfield | G06F 17/30731 |
| 2008/0310736 | A1* | 12/2008 | Chattopadhyay | G06F 11/3692 382/218 |
| 2009/0103769 | A1* | 4/2009 | Milov | G06F 11/3688 382/100 |
| 2009/0158179 | A1* | 6/2009 | Brooks | G06Q 10/00 715/762 |
| 2009/0217182 | A1* | 8/2009 | Grechanik | G06F 8/38 715/762 |
| 2009/0320002 | A1* | 12/2009 | Peri-Glass | G06F 11/3688 717/131 |
| 2010/0305991 | A1* | 12/2010 | Diao | G06Q 10/1097 705/7.21 |
| 2011/0035688 | A1* | 2/2011 | Kinoshita | G06F 3/0481 715/763 |
| 2011/0099499 | A1* | 4/2011 | Pnueli | G06F 8/38 715/771 |
| 2011/0131479 | A1* | 6/2011 | Padgett | G06F 3/04895 715/223 |
| 2011/0321008 | A1* | 12/2011 | Jhoney | G06F 8/38 717/114 |
| 2012/0047130 | A1* | 2/2012 | Perez | G06F 8/34 707/723 |
| 2012/0144325 | A1* | 6/2012 | Mital | G06F 9/4446 715/763 |
| 2012/0166976 | A1* | 6/2012 | Rauh | G06F 8/38 715/762 |
| 2012/0198364 | A1* | 8/2012 | Bornheimer | G06F 8/77 715/762 |
| 2012/0233599 | A1* | 9/2012 | Valdiviezo Basauri | G06F 11/3608 717/126 |
| 2012/0266131 | A1* | 10/2012 | Nojiri | G06F 8/38 717/107 |
| 2013/0055117 | A1* | 2/2013 | Sahibzada | G06F 8/38 715/762 |
| 2014/0189576 | A1* | 7/2014 | Carmi | G06F 3/0481 715/781 |

OTHER PUBLICATIONS

Issa et a. Visual Testing of Graphical User Interfaces: an Exploratory Study Towards Systematic Definitions and Approaches. 978-1-4673-30556-58/12 © 2012 IEEE. pp. 11-14.*

Mahajan et al. Visual and Textual Consistency Checking Tools for Graphical User Interfaces. IEEE Transactions on Software Engineering, vol. 23, No. 11, Nov. 1997.*

Katara et al. Making Model-Based Testing More Agile: A Use Case Driven Approach. E. Bin, A. Ziv, and S. Ur (Eds.): HVC 2006, LNCS 4383, pp. 219-234, 2007.*

Lee, Jason Chong. Integrating scenario-based usability engineering and agile software development. Dissertation, Virginia Polytechnic Institute and State University. 2010. 350 pages.*

Garner, Stephen R.; WEKA: The Waikato Environment for Knowledge Analysis; available online at http://citeseerx.ist.psu.edu/viewdoc/download?doi=10.1.1.54.3371&rep=rep1&type=pdf; publication date unknown, In Proc. of the New Zealand Computer Science Research Students Conference, 1995.

Papari, G. and Petkov, N.; Algorithm that Mimics Human Perceptual Grouping of Dot Patterns; Institute of Mathematics and Computing Science University of Groningen; 2005.

Quinlan, J. R.; Induction of Decision Trees; Kluwer Academic Publishers, Boston; Machine Learning 1: 81-106; 1986.

* cited by examiner

```
=== Evaluation on training set ===
=== Summary ===

Correctly Classified Instances         9              100      %
Incorrectly Classified Instances       0                0      %
Kappa statistic                        1
Mean absolute error                    0
Root mean squared error                0
Relative absolute error                0      %
Root relative squared error            0      %
Total Number of Instances              9

=== Detailed Accuracy By Class ===

TP Rate   FP Rate   Precision   Recall   F-Measure   ROC Area   Class
                 1         0          1          1         1           1       JLabel
                 1         0          1          1         1           1       JCheckBox
                 1         0          1          1         1           1       JRadioButton
Weighted Avg.    1         0          1          1         1           1

=== Confusion Matrix === a b c   <-- classified as
 3 0 0 | a = JLabel
 0 3 0 | b = JCheckBox
 0 0 3 | c = JRadioButton
```

*Fig. 19*

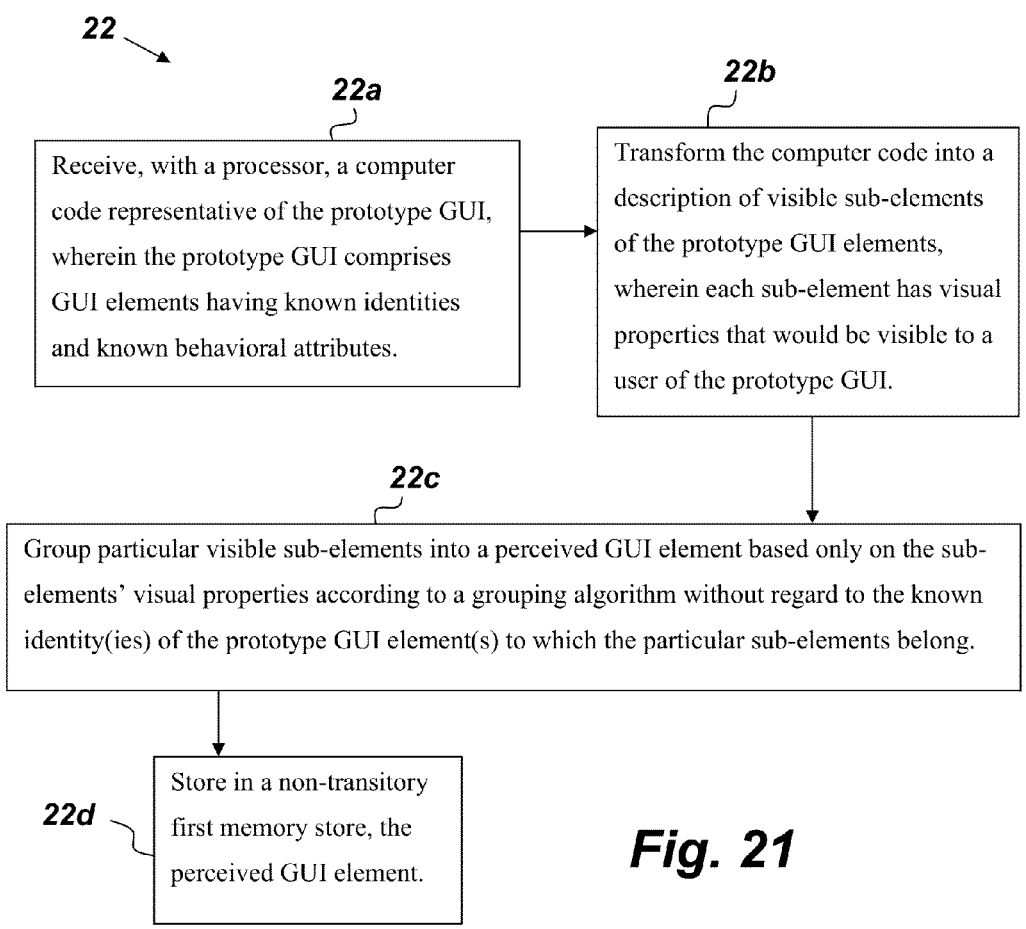

METHOD FOR ANALYZING GUI DESIGN AFFORDANCES

CROSS-REFERENCE TO RELATED APPLICATION

This application is a continuation-in-part of prior U.S. application Ser. No.: 13/097,969, filed 29 Apr. 2011, titled "System and Method for Analyzing GUI Design Affordances" (Navy Case #100962), which application is hereby incorporated by reference herein in its entirety for its teachings, and referred to hereafter as "the parent application."

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 102901.

BACKGROUND OF THE INVENTION

The human-computer interface is becoming an increasingly critical sub-element impacting successful human system integration. The current approach to developing and evaluating graphical user interface (GUI) designs involves an iterative cycle—design, build, prototype. There are several drawbacks to this approach. For example, there is no precise method to prescribe a display layout or design based upon the task information requirements; thus, the iterative testing of hypothesized best layouts is required. The "size" of the design space and the constraints of the design space are unclear and unbounded. Another problem is that the proof of the value of these design hypotheses lies solely in usability testing by a human user and data collection. The degree to which this testing can be effectively done is debatable since time constraints pose various limitations—for example, a small number of prototype subjects and prototypes with limited fidelity are typical drawbacks for these studies. Hopefully, design alternatives evolve to contain information that is deemed critical to support cognitive and perceptual processes for each task domain. Unfortunately, this information is not explicitly captured by the design process, but rather is implicitly embodied in the final design.

At best, the design, build, prototype GUI design process produces a heuristic set of "lessons learned" and hopefully a usable interface that meets task performance requirements. As viewed from the most negative perspective, the design, build, prototype design process may require many cycles of empirical testing of ad hoc systems that is terminated when project resources are expended or when performance results are finally achieved. Unfortunately if resources are expended, a design that is just "good enough" may be accepted vs. one that is optimal for task conditions. A need exists for a method of analyzing GUI designs prior to usability testing by a human user.

SUMMARY

Disclosed herein is a method for analysis of a prototype graphical user interface (GUI). The first step of the GUI analysis method provides for receiving, with a processor, a computer code representative of the prototype GUI. The prototype GUI comprises GUI elements having known identities and known behavioral attributes. The second step provides for transforming the computer code into a description of visible sub-elements of the prototype GUI elements. Each sub-element has visual properties that would be visible to a user of the prototype GUI. The third step provides for grouping particular visible sub-elements into a perceived GUI element based only on the sub-elements' visual properties according to a grouping algorithm without regard to the known identity(ies) of the prototype GUI element(s) to which the particular sub-elements belong; and storing, in a non-transitory first memory store, the perceived GUI element.

The GUI analysis method may also be described as comprising the following steps. The first step provides for receiving computer code representing a prototype GUI. The computer code comprises a ground truth representation of the identities of the prototype GUI's constituent parts. Another step provides for identifying GUI sub-elements within the computer code that would be visible to a user when displayed on the prototype GUI. Another step provides for grouping the visible GUI sub-elements into a perceived GUI element based on the sub-elements visual properties regardless of the ground truth. Another step provides for comparing the perceived GUI element to a perceptual representation of generic GUI elements to find a generic GUI element with visual properties that most closely match the visual properties of the perceived GUI element. Another step provides for assigning the identity of the closest-matched generic GUI element to the perceived GUI element as a perceived identity. Another step provides for comparing the perceived identity to the ground truth representation. Another step provides for flagging instances where the perceived identity does not match the ground truth representation.

Another embodiment of the GUI analysis method is also described herein. In this embodiment, the first step provides for receiving, with a processor, computer code representative of a prototype GUI. The prototype GUI comprises actual GUI elements having known identities and known behavioral attributes. The processor is operatively coupled to first and second non-transitory memory stores and the second memory store comprises a list of generic GUI elements and the visual and behavioral properties corresponding to each generic GUI element. The next step provides for transforming a runtime object into an Extensible Markup Language (XML) data structure that captures dynamic properties of the run time object. The XML data structure includes a description of the visual properties of the actual GUI elements and sub-elements that make up the prototype GUI. Each sub-element has visual properties that would be visible to a user of the prototype GUI. The next step provides for grouping the sub-elements into perceived GUI elements based only on the visual properties of the sub-elements and storing the perceived GUI elements in the first memory store. The next step provides for flagging instances where a perceived GUI element includes sub-elements from more than one actual GUI element. The next step provides for comparing each perceived GUI element to the list of generic GUI elements to find the closest match. The next step provides for assigning the identity of the closest-matched generic GUI element to the perceived GUI element. The next step provides for flagging instances where the assigned identity of the perceived GUI element does not match the known identity of the actual GUI element. The next step provides for predicting a behavioral response of the perceived GUI element to an action based on a behavioral response associated with the assigned identity. The next step provides for virtually performing the action on the prototype GUI. The next step provides for comparing the run time object prior to performance of the action to the run time object after performance of the action to determine an actual action-response. The next step provides for comparing the predicted, behavioral action-response to the actual action-response. The last step provides for flagging instances where the behavioral action-response does not match the actual action-response.

BRIEF DESCRIPTION OF THE DRAWINGS

Throughout the several views, like elements are referenced using like references. The elements in the figures are not drawn to scale and some dimensions are exaggerated for clarity.

FIG. 19 is an example screen-shot showing the output of a training model.

FIG. 21 is a flow chart of a GUI analysis method.

DETAILED DESCRIPTION OF EMBODIMENTS

Figure 1:
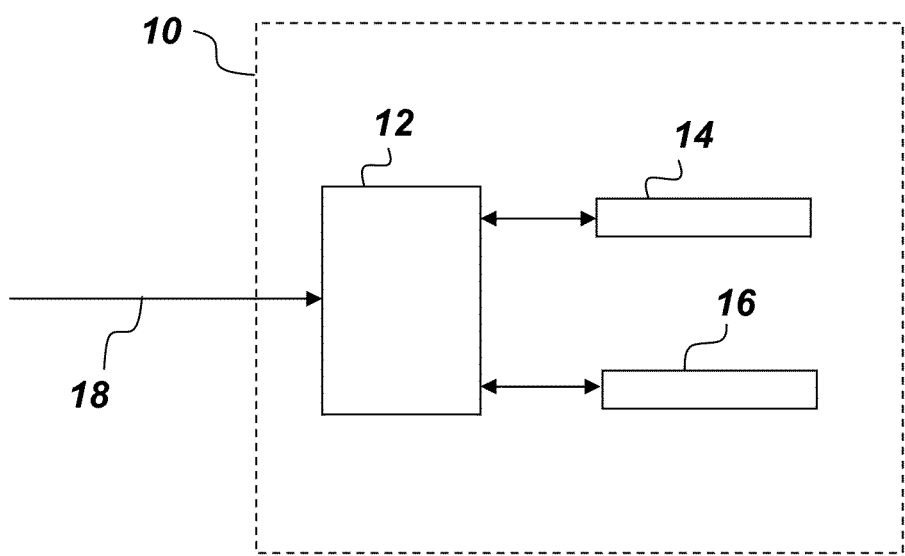
FIG. 1 is a block diagram of parts of a system used for analyzing a prototype GUI.

Disclosed herein is a method for analyzing a graphical user interface (GUI). While the GUI analysis method is intended as an aid during the early stages of development of the GUI, it is to be understood that the method may be used to evaluate any GUI at any stage of the GUI's life. The GUI analysis method may comprise several sub-analyses that may be performed on a prototype GUI, including What, How, and Where/With analyses. The term "prototype GUI", as used herein, means any given GUI that is to be analyzed by the GUI analysis method regardless of the age and/or development stage of the given GUI. The What analysis offers an answer to the question of, "Would a human user be able to correctly identify the individual GUI elements on the prototype GUI?" The How analysis answers the question, "Do the prototype GUI elements behave as a human user would expect them to?" The Where/With analysis provides an answer to the question of "Is each prototype GUI element arranged on the display properly in relation to the other prototype GUI elements?" The method disclosed herein may be implemented as a software based tool and may be used to support analysis of human computer interface (HCI) designs during the design process.

In order for a user to successfully accomplish a task on an interface, the user should have the correct task and device goals. Task goals are part of the user's long term memory and knowledge about the subject matter. These goals are independent of any particular interface and may be quite general: "Write a report." Device goals refer to specific interface "states." A device state is the state that the interface must be in so that the user may accomplish a specific task. Thus, for every set of user task goals, there is a corresponding set of device states that the interface must be placed in, before the user can accomplish their task. A user may know what his/her task goal is but if an interface is novel, how does the user discover the correct set of device goals in order to accomplish his/her task? The latter is a key to good interface design, that is, a new user does not know, a priori, the necessary device goals of an interface. The interface must lead the user to easily explore and determine what the device goals are for a given task. Interface "affordances" can be useful in leading the user to discover the correct device goals. The term "affordances" as used herein refers to what a given interface 'affords' the user—that is, what the interface will allow the user to do. In this context, interface affordances refer to those features of the interface that suggest to the operator what the system may be used for.

The GUI analysis method disclosed herein utilizes a cognitive architecture that is capable of analyzing interface design with respect to affordances. A cognitive architecture may be defined as a set of features that represent human abilities. Cognitive architectures may be comprised of perceptual, motor and cognitive processors. For example, perceptual processors model visual and auditory capabilities. Motor processors model ocular, vocal, and manual motor capabilities. Cognitive processors model long-term memory, working memory, production rule memory, and problem solving capabilities. Because cognitive architectures provide a set of performance constraints, they may be used to predict human performance for various tasks that require perceptual, motor and cognitive activity. Thus, tasks typically studied in a psychology laboratory may be modeled and compared to actual human performance data. The GUI analysis method disclosed herein incorporates a cognitive architecture that constrains perceptual and cognitive performances along lines of higher level processing that may be used to evaluate affordances of a prototype GUI.

Described broadly, the GUI analysis method is an expert system that mimics the feedback provided by a human-factors analyst during HCI design by: 1) parsing the prototype GUI into perceived GUI elements and their attributes; 2) analyzing the perceived GUI elements in terms of grouping and classification, and 3) analyzing the layout and appearance of the perceived GUI elements in terms of common violations of user interface principles. The GUI analysis method incorporates a tailored cognitive architecture that represents elements of human perceptual and cognitive capabilities useful to apprehending interface affordances.

FIG. 1 is a block diagram illustrating parts of a system 10 utilized in the method for analyzing a prototype GUI. As shown in FIG. 1, system 10 comprises a processor 12, a first non-transitory memory store 14, and a second non-transitory memory store 16. The processor 12 is operatively coupled to the first and second memory stores 14 and 16, and is configured to receive computer code 18 that represents a prototype GUI.

The computer code 18 may come from a GUI builder such as a GUI design tool. Developers typically use Drop-and-Drag GUI Design tools to create new displays. A set of GUI elements, such as labels, checkboxes, radio buttons, menu bars, buttons, text boxes, pull-down menus etc., are typically provided by the given design tool. Each GUI element has defining visual features that distinguish it from other GUI elements. The developer selects and drags these GUI elements with known identities and known behavioral attributes into place on an interface to create a prototype GUI design concept. The computer code 18 received by the GUI analysis system 10 comprises the prototype GUI. For example, the computer code 18 may comprise run-time object code that is representative of the prototype GUI. The steps of the GUI analysis method may be performed without the source code of the prototype GUI. The first and second memory stores 14 and 16 may be any non-transitory computer-readable medium, comprising for example, computer memory and/or the nonvolatile storage of a computer.

Figure 2:
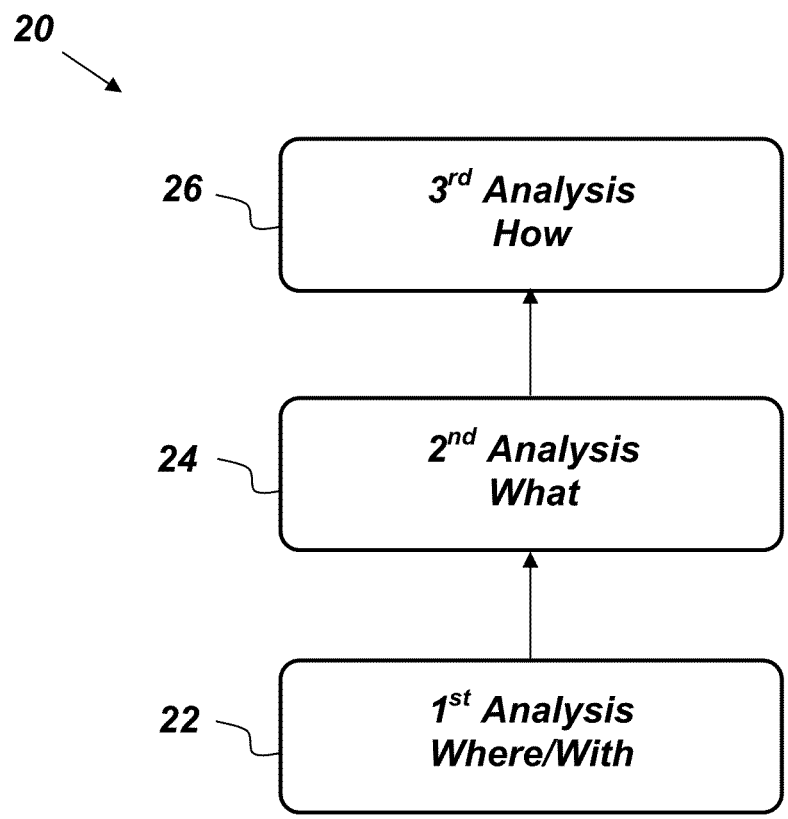
FIG. 2 is a flowchart showing sub-analyses of a GUI analysis method.

FIG. 2 is an illustration of the architecture of the GUI analysis method 20, which comprises three sub-elements: a first analysis 22, a second analysis 24, and a third analysis 26. The first analysis 22, which may be referred to as the Where/With analysis, derives a perceptual representation of the visual attributes of the prototype GUI elements and GUI sub-elements. This represents what a user sees when viewing the prototype GUI. This representation is analogous to the user's short term memory (STM), also referred to as working memory, as he/she views the prototype GUI. This representation specifies where each sub-element is located and also includes the perceived grouping of the sub-elements. That is, the representation specifies which sub-elements are perceived to belong with other sub-elements as parts of a single GUI element.

The second analysis 24, which may be referred to as the What analysis, assigns an identity to perceived GUI elements in the prototype GUI based on how the GUI elements look. The perceptual representation of the GUI elements derived by the second analysis 24 is trainable and is akin to the user's long term memory (LTM) where the user stores his/her knowledge of GUI elements. This knowledge underlies recognition of elements based on their attributes captured in the first analysis 22.

The third analysis 26, which may be referred to as the How analysis, tests how GUI elements behave and whether their behaviors match the user's expectations. The third analysis derives a representation of actions that the user can perform on GUI elements. This representation is analogous to the user's procedural knowledge, stored in the user's LTM, of GUI elements that predicts what actions can be performed with given elements once they have been identified. This representation also generates predictions and expectations for how a given GUI element should behave based on what the given GUI element was identified as being in the second analysis 24.

Figure 3:
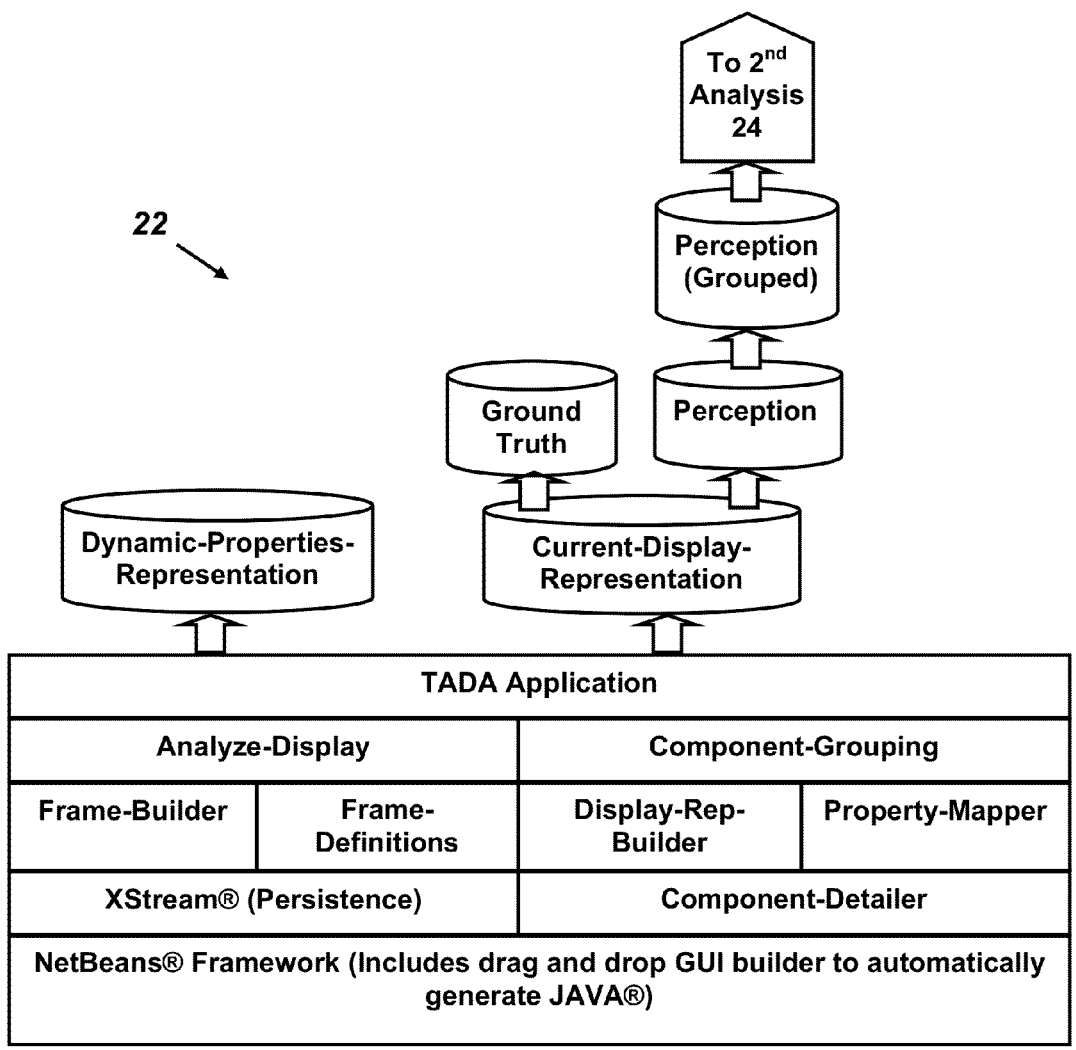
FIG. 3 is an example architecture of a first sub-analysis of a GUI analysis method.

FIG. 3 is an example architecture of the first sub-analysis 22 of the GUI analysis method 20. The GUI analysis method 20 may use an integrated development module for creating a theory of design affordances (TADA) application. Whenever a TADA application project is started a drag and drop GUI builder may then be utilized to generate a prototype GUI. When the TADA application runs, the prototype GUI may be instantiated. The dynamic run time object may be made persistent as an Extensible Markup Language (XML) data structure that captures all the dynamic properties of the run time object. Thus, the GUI analysis method 20 may use as input the representation of a display outputted by a GUI Design tool and may automatically convert that into a description, captured in XML, of the visual properties of the GUI elements and sub-elements that make up the prototype GUI. In this example embodiment, the first analysis 22 may derive the perceptual representation by creating several intermediate XML representations and uses JAVA® programs that operate on these XML representations. This perceptual representation may be stored in the first memory store 14.

Figure 4:
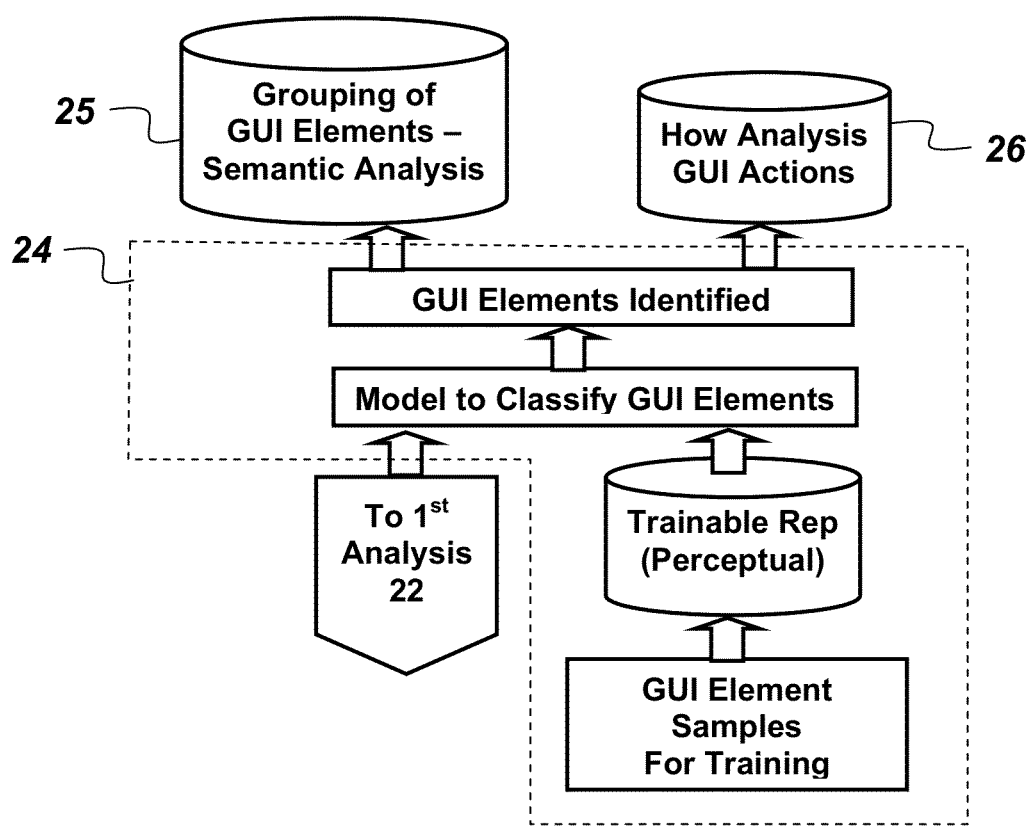
FIG. 4 is an example architecture of second and third sub-analyses of a GUI analysis method.

FIG. 4 is an example architecture of the second and third sub-analyses 24 and 26. FIG. 4 also depicts an optional semantic analysis 25. In this embodiment of the GUI analysis method 20, the second sub-analysis 24 is configured to create a trainable perceptual representation of generic sample GUI elements and then to compare the trainable perceptual representation with the perceptual representation of the prototype GUI derived in the first sub-analysis 22. The trainable perceptual representation may be stored in the second memory store 16. The trainable perceptual representation is analogous to the user's general knowledge of GUI elements that underlies his/her recognition based on visual attributes. In other words, in this embodiment of the second sub-analysis 24, each perceived GUI element is assigned an identity based on its visual features' similarities to the visual features of a given sample generic GUI element. The third sub-analysis 26 may be configured to analyze actions that could be performed on each perceived GUI element by virtually performing an action on the perceived GUI element and comparing the result of the action to the known behavior of the sample generic GUI element with the same identity. The third sub-analysis 26 may also be configured to generate predictions and expectations for how the perceived GUI elements should behave.

The following is a detailed description of one embodiment of the GUI analysis method 20. Developers typically use Drop-and-Drag GUI Design tools to create new displays. NetBeans® is an example of a JAVA® GUI Integrated Development Environment (IDE) that provides a set of JAVA® objects, often referred to as widgets, for the purpose of GUI design. Both "JAVA® objects" and "widgets" are examples of GUI elements, which may include labels, checkboxes, radio buttons, menu bars, buttons, text boxes, pull-down menus etc. Each of these GUI elements has object member variables that may be manipulated by the designer to change different visual and user-interaction aspects (look and feel) of the element. Visually distinct components of the GUI element shall be referred to hereafter as sub-elements. The object member variables mentioned above may directly affect the look and feel of the sub-elements. For example, a designer may choose to alter the line style, thickness, transparency, color, etc. of a given border, which is an example of a sub-element.

Figure 5:
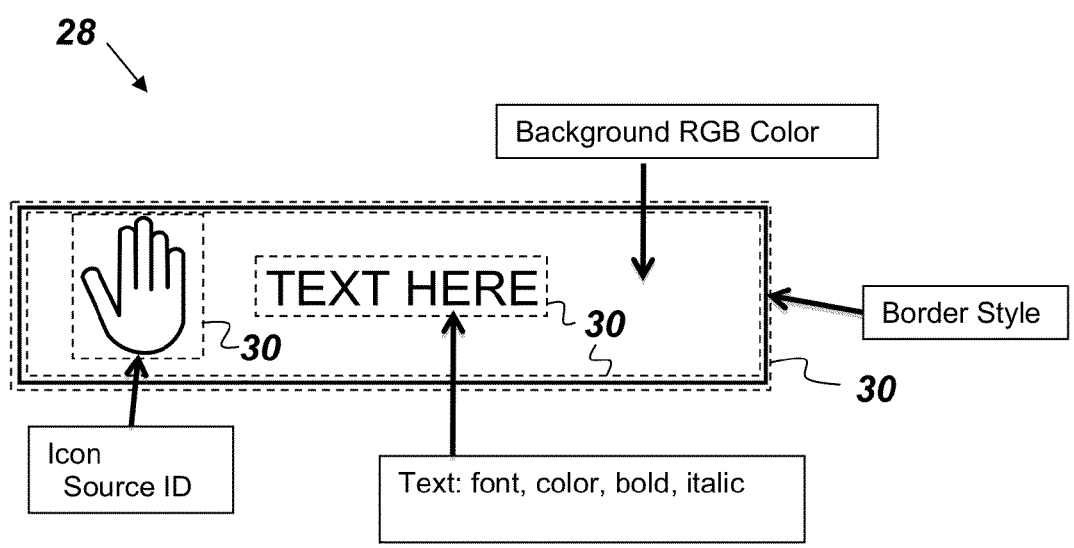
FIG. 5 is an example of a generic GUI element.

FIG. 5 is an example of a generic GUI element 28, showing some of the sub-elements and visual properties associated with that GUI element. The example generic GUI element 28 shown in FIG. 5 is a "label" that has member variables that change to represent different visual aspects of the GUI element. The behavioral description of each generic GUI element may comprise information describing actions a user may perform on the corresponding generic GUI element and how the corresponding generic GUI element behaves when manipulated by the user. The generic GUI element 28 shown in FIG. 5 is an example of a "JLabel", which is a JAVA® object. This embodiment of the generic GUI element 28 comprises or consists of the following visible sub-elements 30: a border, a background, an icon, and text. A dotted rectangle has been placed around each sub-element 30 shown in FIG. 5.

Each visible sub-element has associated visual properties. For example, the border comprises visual properties of border-line thickness, border-line color, shadow effect, border style, etc. The background comprises the visual property of background color. The text comprises the visual properties of font, text color, text size, and text style. The icon comprises the visual properties of color, shape, shading, etc. The generic GUI element 28 also comprises visual properties of height, width, and position (such as x and y coordinates) on the GUI. Associated with each of the sub-elements 30 are further properties: horizontal position, vertical position, vertical alignment, horizontal alignment, icon text gap, etc.

In one embodiment, the GUI analysis method 20 may be combined with a GUI builder such as the NetBeans® IDE where a developer may select and drag GUI elements into place on the prototype GUI and set the properties of their sub-elements. In this embodiment, once the developer completes the prototype GUI, the NetBeans® environment generates JAVA® code that represents the newly developed GUI. Using the public domain XStream® library the object member variables of JAVA® widget classes are stored in XML. Thus, the combination of NetBeans® and XStream® allow the developer to create a TADA project template within the NetBeans® IDE. A TADA project template is a NetBeans® module containing an empty JFrame for the developer to add his or her design sub-elements and a main program that instantiates the JFrame. Instead of creating a new JAVA® project, in this embodiment, the developer may create a new TADA project, which is essentially a NetBeans® project but it has the added feature of automatically creating several new files that are necessary for the GUI analysis method 20.

Although, in the embodiment above, XStream® captures and converts dynamic properties of JAVA® GUI elements to XML, there are ways to capture greater detail of the GUI sub-elements. In particular the (x, y) spatial location and size of each sub-element may be specified. These attributes are not directly available as properties but can be inferred from available object member variable properties. A derived Serializable Converter (which overloaded the XStream® SerializableConverter) may be used to insert custom hooks which have the potential to extract any additional required data (on an element by element basis) and store that data in the XStream® XML output. A "Detailer" may be implemented which has the capability to generate custom data for any GUI element. The detailer may be open architecture in that custom detailers are created and registered as needed. By overloading the marshalling capability of XStream®, custom properties may be inferred and included in the XML. In order to capture the size and location of sub-elements, a set of specific member functions can be registered with the XStream® marshalling function.

For example, when a JLabel GUI element is identified during the marshalling process, the JLabel detailer could be used to extract the JLabel's member variables and infer the geometry of the visible sub-elements of the JLabel. For text and icon, their relative positions may be determined using the properties' horizontal text position and vertical text position. Thus, if the horizontal text position is "Leading" then the text will precede the icon (left to right). Next the distance between the icon and the text can be determined by the icon text gap property. If the user supplies the icon, the size of the icon is given by the icon width and height property; otherwise, there is a default size. The size of the text can be determined by using the font metrics such as font style, font size etc. The position data of the sub-elements can be determined relative to their known JLabel position by using the justification properties, horizontal and vertical alignment. The relative geometry of the border is the same as the geometry of the JLabel except for the case of the title border, which may require one to determine the position of the title text. The background visibility is dependent on the opaque property and visibility of the "Background" against its surrounding background color, which may be determined by computing a Luminance contrast ratio, discussed below. If the GUI element's background is deemed visible, then its geometry is the same as the border. While the border may be considered the outline of an unfilled rectangle, the background may be considered as a filled rectangle. Note, in some embodiments, some dynamic properties are not stored for reasons of storage economy; however, when this is the case, these default properties are known and have been inserted into the XML representation of the runtime object.

To develop the custom detailers, feedback is required. One way to provide feedback on the successful localization of the sub-elements is to utilize JAVA®'s "Glasspane" feature for drawing rectangles that can overlap arbitrary parts on a JAVA® Frame object without being confined to a canvas background. In addition to development feedback, this drawing technique may be useful for demonstration purposes. Custom detailers were developed for JLabel, JRadioButton, JCheckBox, JButton, JTextField, and JTextArea. Example screen shots of the output of some of the custom detailers can be seen in FIGS. 7, 8B, 9B, 12B, and 16B, which visualize the rectangles.

Figure 6:
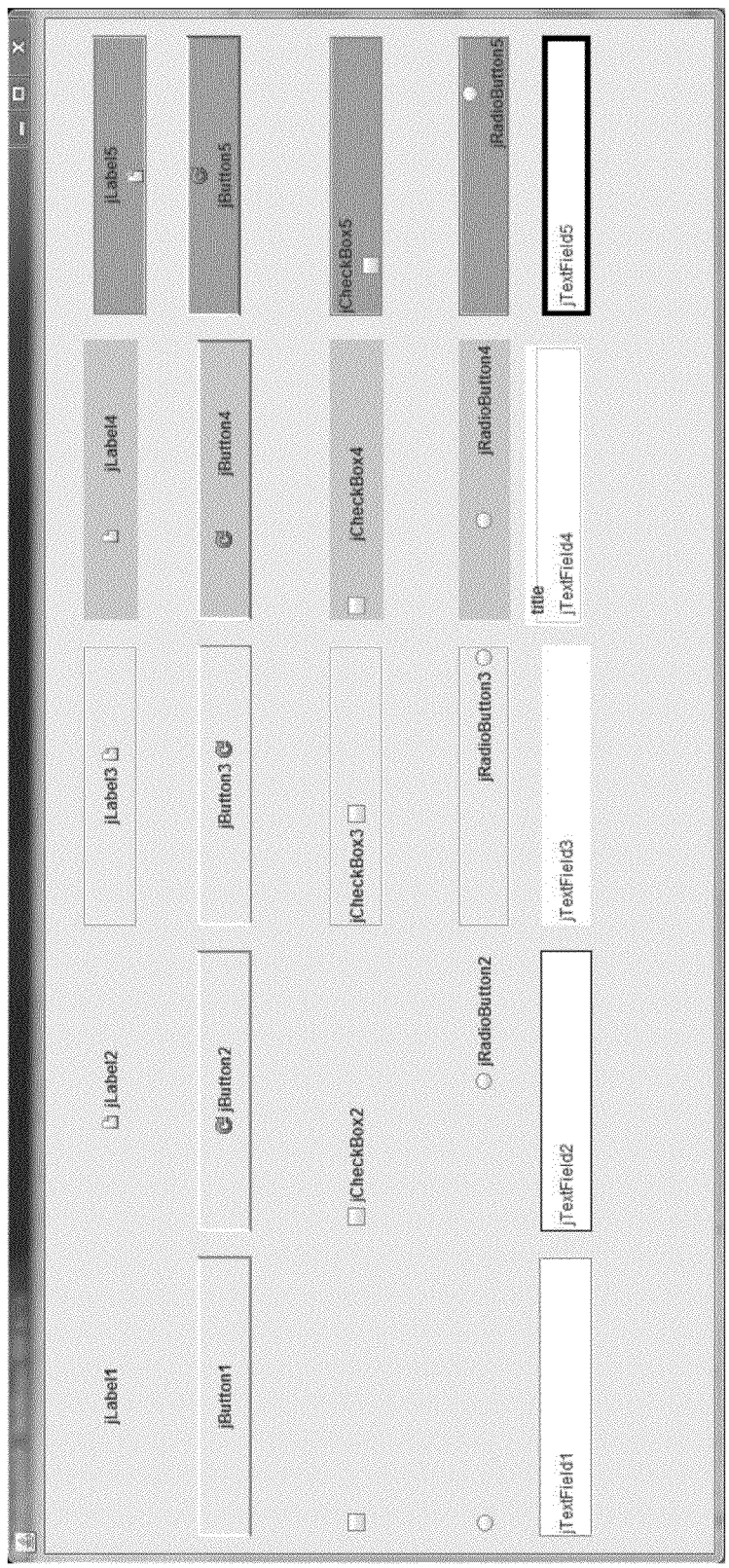
FIG. 6 is a GUI screen-shot displaying variations in labels, buttons, check boxes, radio buttons, and text fields.
Figure 7:
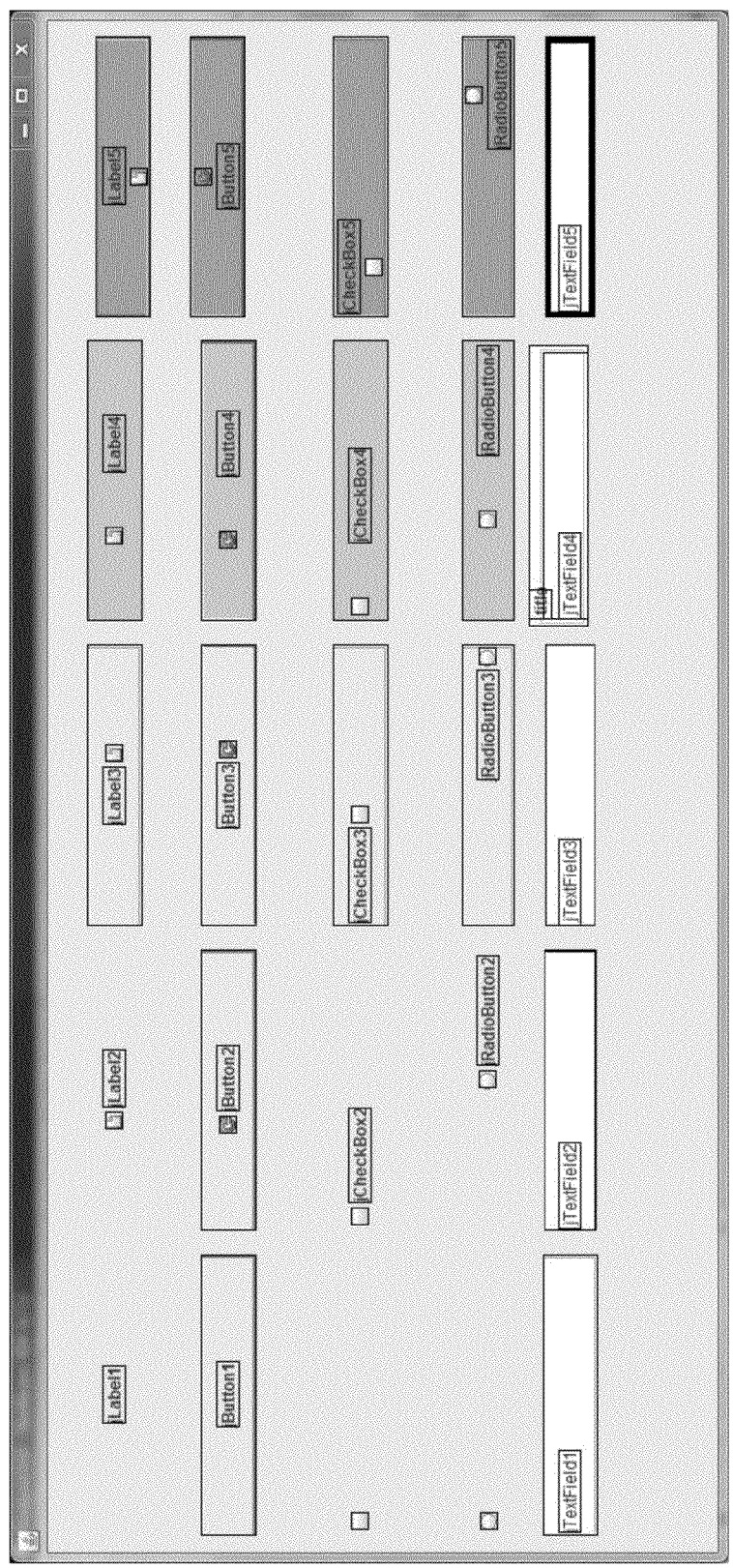
FIG. 7 is a GUI screen-shot displaying variations in labels, buttons, check boxes, radio buttons, and text fields.

FIGS. 6 and 7 display variations in labels, buttons, check boxes, radio buttons, and text fields. These variations may be achieved by modifying the member variables for each of the GUI elements. Each JAVA® GUI element shown in FIG. 6 may be circumscribed by a rectangle having a length and width dependent on the geometry of the GUI element. The position of each GUI element may be defined to be the x and y coordinates of the top left hand corner of that rectangle. The internal geometry of the sub-elements may vary from one GUI element to the next, even between GUI elements of the same type such as the labels in the top row of GUI elements shown in FIG. 6. As discussed above, in order to capture this variation, numerous attributes of the GUI elements may be taken into account in order that these sub-elements may be properly located. Once these visual properties have been taken into account, a rectangle that circumscribes each sub-element and the position of this rectangle may be determined. FIG. 7 is a screen-shot of an output from a detailer showing rectangles circumscribing each visible sub-element. FIG. 7 demonstrates the ability of the detailer to correctly identify the spatial location of the sub-elements regardless of their changing relative positions to one another.

Figure 8A:
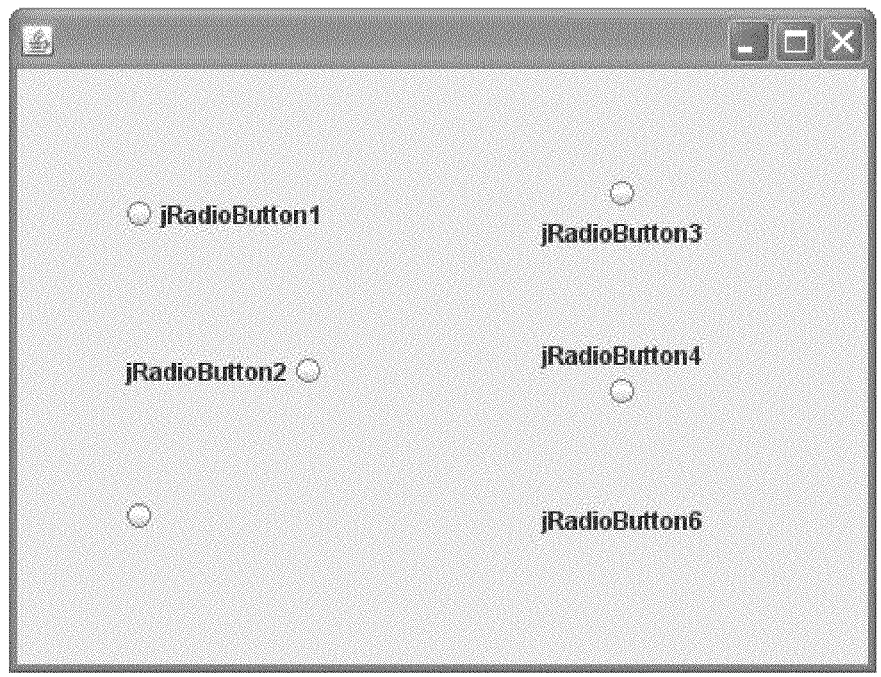
FIGS. 8A-8B are GUI screen-shots.
Figure 8B:
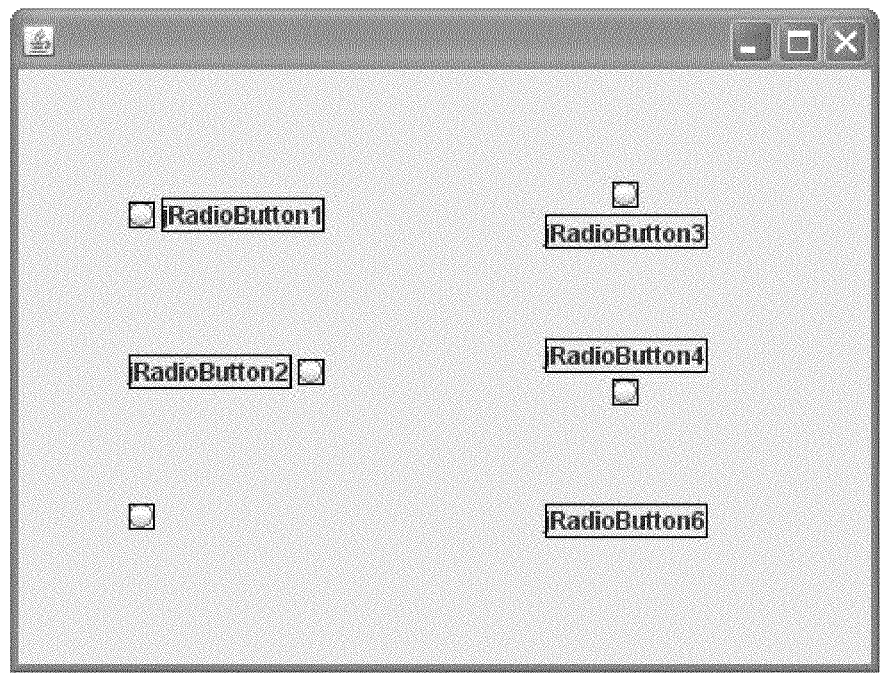

FIGS. 8A and 8B depict several versions of a radio button GUI element. Each version differs from the others in terms of presence and/or configuration of sub-elements. FIGS. 8A and 8B demonstrate possible variation in the internal geometry of GUI elements of the same type. FIG. 8B shows how the detailer is capable of identifying sub-elements by circumscribing each sub-element with a rectangle. The detailer is capable of capturing the location of the sub-elements regardless of the change in their relative spatial positions.

In addition to capturing the spatial location of the sub-elements, the general visibility of each of the sub-elements may also be tested. This may be achieved by using a Luminance Contrast Ratio to determine the perceived background of color differences. The luminance contrast ratio L may use the W3C® standard for relative luminance which is defined to be:

$$L = 0.2126*R + 0.7152*G + 0.0722*B \tag{1}$$

Where R (red), G (green) and B (blue) are defined in terms of a colorspace sRGB. The sRGB color space normalizes RGB values between 0 and 255 to between 0 and 1 (by dividing by 255). Thus R, G, B in the equation (1) are defined as follows:

$$\text{if } RsRGB <= 0.03928 \text{ then } R = RsRGB/12.92 \text{ else}$$
$$R = ((RsRGB + 0.055)/1.055)^{2.4} \quad (2)$$

$$\text{if } GsRGB <= 0.03928 \text{ then } G = GsRGB/12.92 \text{ else}$$
$$G = ((GsRGB + 0.055)/1.055)^{2.4} \quad (3)$$

$$\text{if } BsRGB <= 0.03928 \text{ then } B = BsRGB/12.92 \text{ else}$$
$$B = ((BsRGB + 0.055)/1.055)^{2.4} \quad (4)$$

RsRGB, GsRGB and BsRGB are defined as: RsRGB=R8 bit/255, GsRGB=G8 bit/255, and BsRGB=B8 bit/255. The Contrast Ratio=(L1+0.05)/(L2+0.05), where L1 is the relative luminance of the lighter of the colors, and L2 is the relative luminance of the darker of the colors. The contrast ratios can range from 1 to 21 (commonly written 1:1 to 21:1).

Figure 9A:
FIGS. 9A-9B are GUI screen-shots.
Figure 9B:
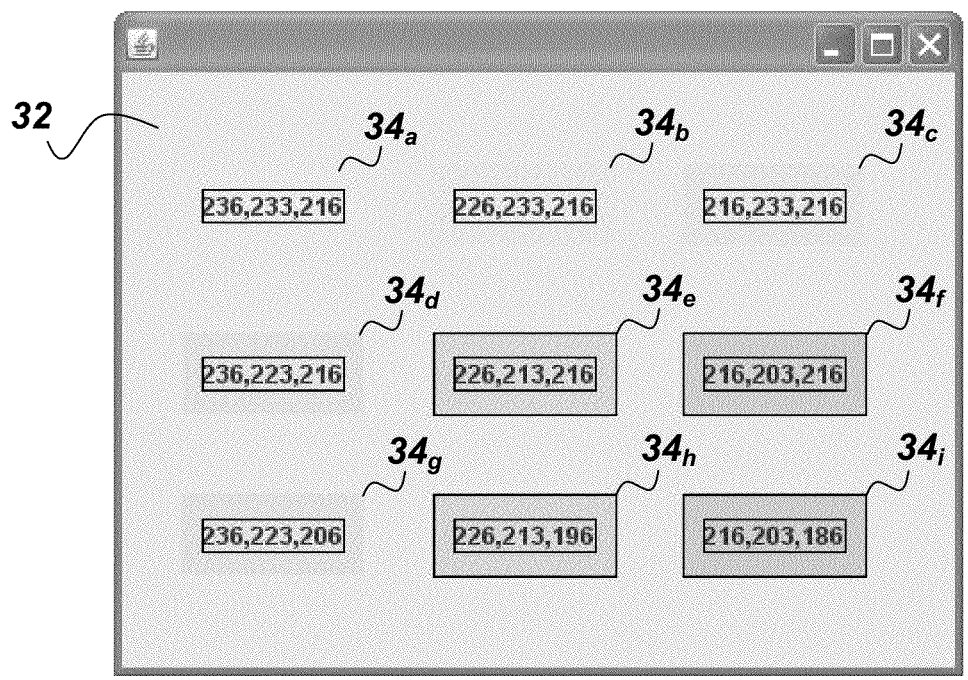

FIGS. 9A and 9B are screen shots showing example GUI elements (in this case JLabels) with various background colors. The text in each given GUI element label in FIGS. 9A and 9B shows the Red, Green, and Blue (RGB) background values that correspond to the background color of the given GUI element. RGB values are integers that vary between 0 and 255. In these examples R=236, B=233 and G=216, matches exactly with the background color of the panel 32. FIGS. 9A and 9B demonstrate how the visibility of the label background changes as the RGB values are modified. The background of the JLabel in the upper left hand corner of the panel 32 exactly matches the background of the panel 32; therefore, that particular JLabel's background would not be visible to a user. In this example embodiment, each JLabel has a different combination of Red, Blue and Green background color sub-elements. Larger color variation transitions from the top left corner to the bottom right corner of the panel 32. It can be seen that the contrast between the JLabels continues to vary from subtle to distinct contrast. FIG. 9B differs from FIG. 9A in that rectangles have been drawn around sub-elements that would be visible to a user.

The luminance contrast of any given GUI element may be used as a factor to determine whether or not the given GUI element would be visible to a user. For example, in FIG. 9B, the detailer has placed rectangles around the backgrounds of labels $34_e$, $34_f$, $34_h$, and $34_i$ whose luminance contrast ratio with the surrounding frame (i.e., panel 32) exceeds a threshold that ensures good visibility. In FIG. 9B, the luminance contrast ratio threshold has been set to 1.1. Good usability would expect a distinct contrast difference as shown in FIG. 9B where the system indicates contrast visibility by the background rectangles around labels $34_e$, $34_f$, $34_h$, and $34_i$, which have RBG color combinations of (226, 213, 216), (216, 203, 216), (226, 213, 196), and (216, 203, 186) respectively. The backgrounds of the other labels $34_a$-$34_d$ and $34_g$, shown in FIG. 9B, are not distinct from the panel 32 and are not captured as sufficiently visible sub-elements.

The XML representation captured by XStream® and the Detailer may be outputted to an XML file, Dynamic-Property-Representation. This file is not tailored to a perceptual representation of the GUI element attributes. Perceptual attributes are scattered among the numerous JAVA® properties in each JAVA® widget class. The organization of these classes is tailored to reproducing a run time object from this XML representation. Sets of schemata may be written in XML that contain all the information necessary to generate an Artificial Intelligence (AI) general class knowledge frame representation that explicitly has placeholders (slots) for perceptual and procedural attributes of a set of JAVA® GUI elements. This representation may be captured in an XML file, Widget Frame Definitions. Operating System (OS) context sensitive defaults may be included in the Widget Frame Definitions file. The widget frame is instantiated and the frame slots may be populated by the runtime dynamic GUI element attributes of the display.

Figure 10:
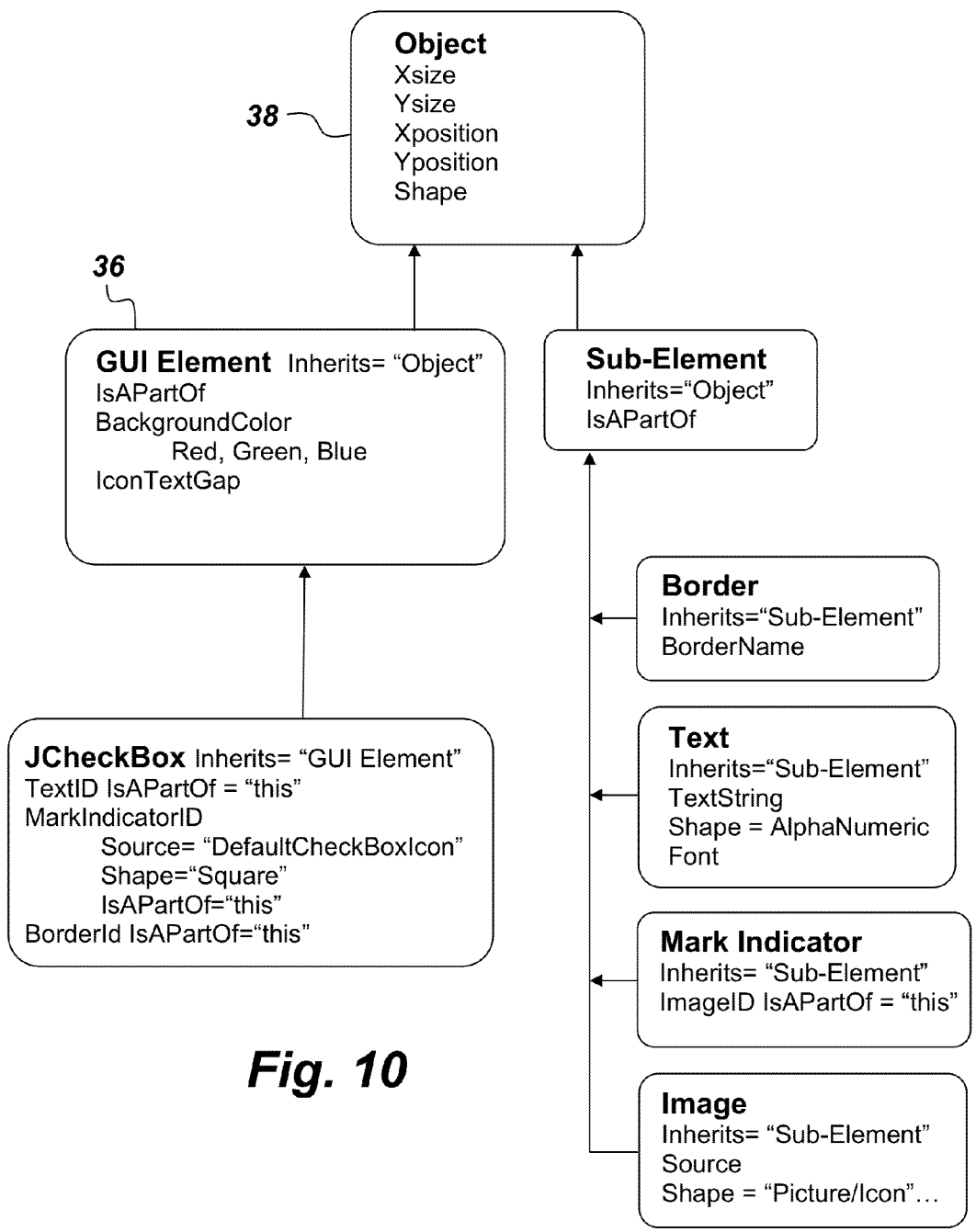
FIG. 10 is an ontology of GUI elements.

FIG. 10 describes the structure for a JCheckBox GUI element found in the Widget-Frame-Definitions file described above. At the highest most abstract level of this ontology, is the class "Object." All objects have certain properties such as position, size, and shape. At the next level there are GUI elements and sub-elements. All GUI elements have certain properties such as background color. FIG. 10 is an example of a perceptual representation of a given GUI element. GUI analysis method 20 creates an artificial intelligence knowledge representation for each GUI element in the prototype GUI that captures the perceptual attributes of each GUI element. This representation is analogous to the visual representation of the prototype GUI that presumably resides in a user's short term visual memory. The category "object," as shown in FIG. 10, includes any perceived collection of attributes that make up a sub-element, or any perceived collection of sub-elements that make up a GUI element. In other words, sub-elements and GUI elements are both considered to be "objects." GUI elements and sub-elements inherit all of the attributes of the object under which they are categorized. Thus, the GUI element 36 shown in FIG. 10 incorporates all of the attributes (e.g. X size, Y size, X position, Y position, Shape) of the object 38. The term "mark indicators," as used in FIG. 10 represents the sub-element from, for example, JCheckBox or JRadioButton which visually changes as a result of a user action. In order to handle the relationship between sub-elements and elements we have included the relation "IsAPartOf." Thus, a border "is-a-part-of" a GUI element. The fact that a GUI element "has-a" border is captured by the XML statement: "IsAPartOf=this," where "this" refers to the instance of the GUI element that is being created. In this manner, the abstract class "Sub-Elements" contains the IsAPartOf relationship, and sub-elements are parts of a particular ("this") GUI element.

The GUI element JCheckBox, described in FIG. 10, has several sub-elements: a Border, a MarkIndicator, and Text. In addition, the GUI element JCheckbox has attributes: Size, Shape, Position, BackgroundColor, IconTextGap, etc. Some of these attributes, IconTextGap and BackgroundColor, for example, are inherited from the abstract class GUI Element, whereas others, Size, Shape, Position, are inherited from the class Object. The attributes of Size, Shape and Position of each sub-element are inherited from the object. Other attributes are unique to the particular sub-element. For example, Text will have a text string associated with it. Border will have a border name that is indicative of the border's unique visual appearance. Some sub-elements can be parts-of yet another sub-element. For example, an Image is a-part-of a Mark Indicator. For the JCheckBox, the image associated with the checkbox is a small square. This image has a source, or file name, that may be specified in the Widget-Frame-Definitions instantiation. The red, green, and blue RGB values of each pixel may be specified in the source file and this detailed information may be captured in the Dynamic-Properties-Representation file. Thus, if further analysis required applying image-processing algorithms to the pixel representation of the image, the information has been captured and may be accessed by the GUI analysis method 20.

In order to populate the runtime dynamic GUI element attributes of the prototype GUI, a JAVA® program, Frame-Builder, may be written that generates the frame structures from Widget-Frame-Definitions. The GUI analysis method 20 may use an invented syntax to map information from the Dynamic-Properties-Representation file into the widget frame slots. This syntax may reside in an XML file, Property-Mapper. The JAVA® program DisplayRepresentationBuilder utilizes DOM—Document Object Model—to generate an XML Tree structure of the display. DisplayRepresentationBuilder looks inside Dynamic-Properties-Representation to find all the GUI elements in the prototype GUI. DisplayRepresentation-Builder then creates an empty instance of each GUI element frame slot using the class Widgets-Frame that is based on the ontology specified in Widget-Frame-Definitions and created using Frame-Builder. Next, DisplayRepresentationBuilder extracts the properties found by applying Property-Mapper to fill in the empty slots. Property-Mapper specifies a mapping between the locations of the properties in Dynamic-Display-Representation and the corresponding widget frame slots. In this manner, DisplayRepresentationBuilder creates the XML file Current-Display-Representation, that captures the first stages of a perceptual representation of the prototype GUI. At this point there are several differences between the information contained in Current-Display-Representation and a perceptual representation of that information. In particular, "IsAPartOf" relationships in Current-Display-Representation contain references between GUI elements and sub-elements that group these together from the perspective of JAVA® object oriented programming. We often refer to the JAVA® object oriented perspective of the display that is captured in Current-Display-Representation as "Ground Truth." As demonstrated herein, the Ground Truth grouping can be very different than the perceptual grouping of sub-elements and elements.

Figure 11:
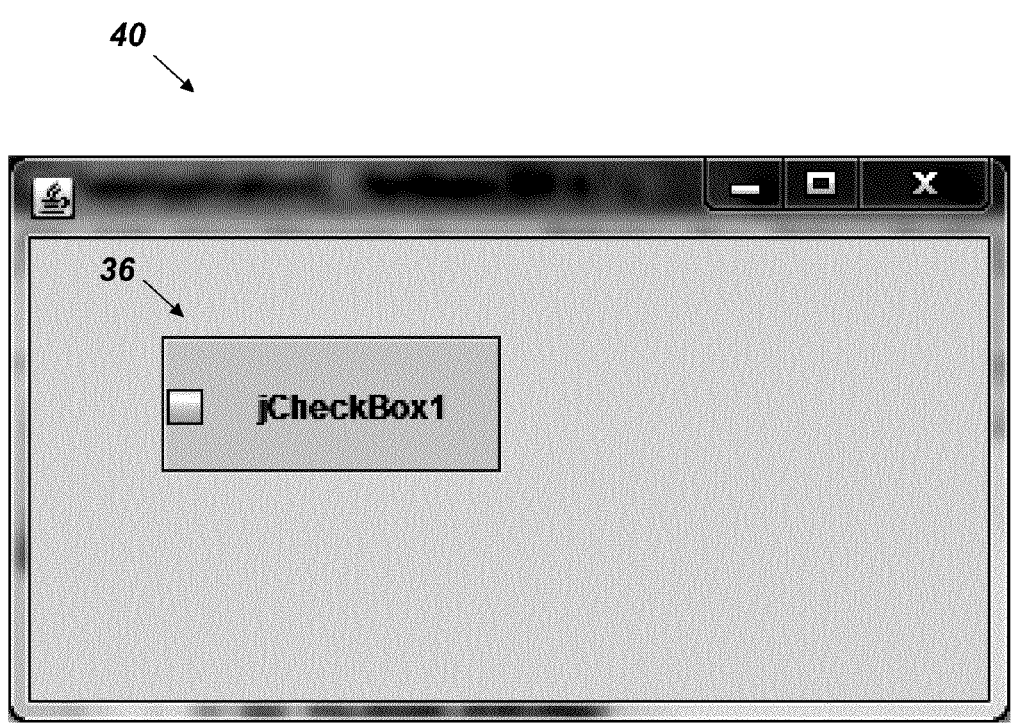
FIG. 11 is a screen-shot of a GUI.
Figure 12:
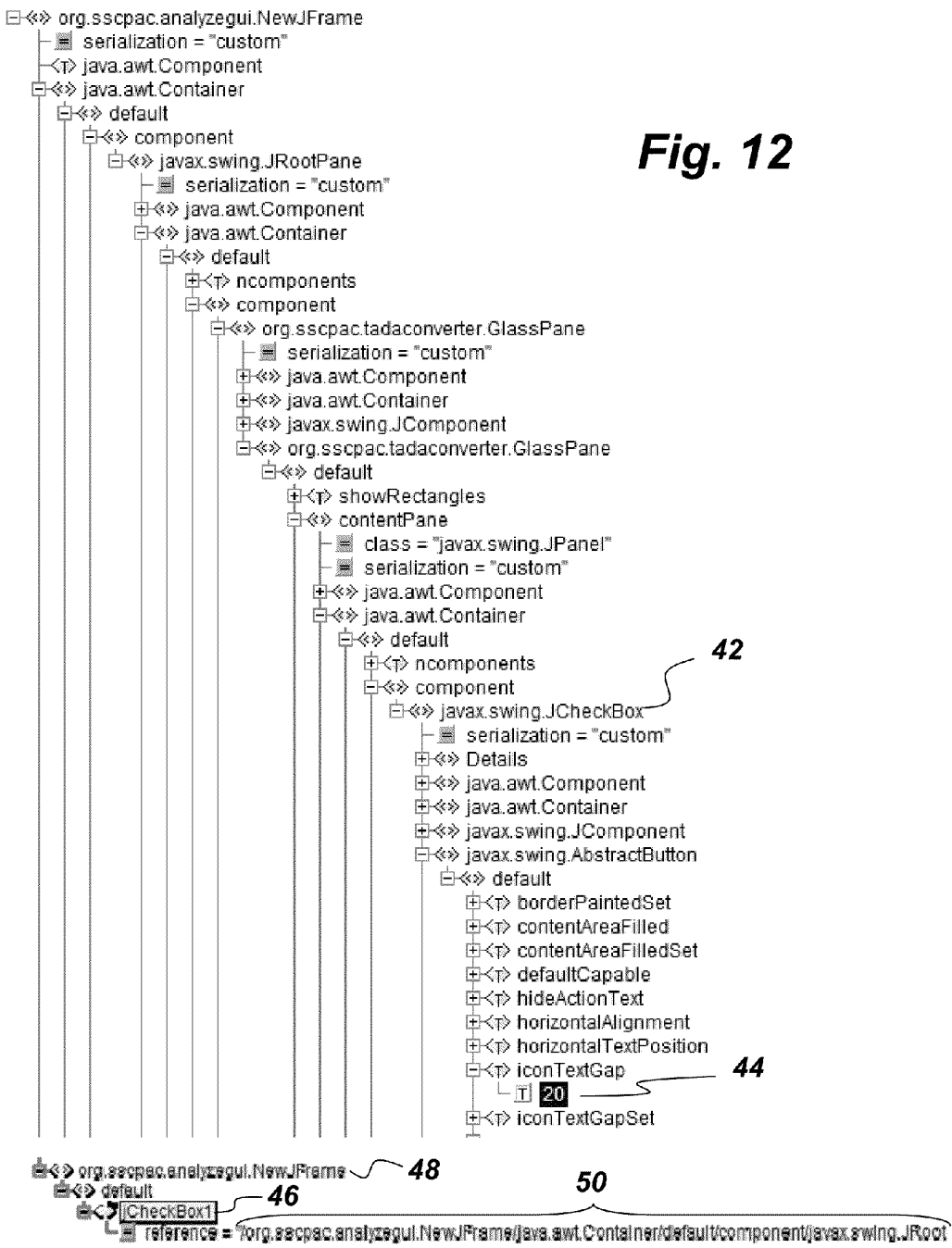
FIG. 12 is an illustration of a small part of an unexpanded XML tree structure.
Figure 13:
FIG. 13 is an expansion of an XML tree structure which illustrates the output of a Component-Detailer.

FIGS. 11-13 illustrate a process of capturing the Current-Display-Representation. In FIG. 11, an embodiment of a prototype GUI 40 is shown which contains a single JCheckbox GUI element 36. The properties (member variables) of the JCheckBox 36 have been modified from default values. For example, the properties BackGroundColor, IconTextGap, and Border have been modified from their default values of (R=240, G=240, B=240), 4, and CompoundBorderUIResource, respectively. The prototype GUI 40 is then instantiated within a TADA Application and the resulting run-time object may be passed to the XStream® marshalling function which generates a large XML tree structure.

FIG. 12 illustrates a small part of the unexpanded XML tree structure from the TADA Application. Note the depth of the nesting for the root of JCheckBox 42. Also note the non-default value of 20 for the property iconTextGap 44. This XML may then be saved to the file Dynamic-Display-Representation. This file may be given as input to the function DisplayRepresentationBuilder which discovers that only one GUI element, jCheckBox1 46, is contained within the NewJFrame 48. Associated with jCheckBox1 46, is a reference 50 to the root of JCheckBox 42. Note that the full reference path is truncated in FIG. 12 due to space limitations. Next, DisplayRepresentationBuilder may call on function Frame-Builder which may generate a frame structure for the JCheckBox 42. The generated frame structure only contains a sparse set of default property values which may be overwritten during the binding process (adding the dynamic property values to the frame structure). Prior to the binding process, the frame structure representation follows:

```
<Application>
    <Class Name="javax.swing.JCheckBox" Inherits="GUI Element"
        ID="jCheckBox1">
    <BorderID BorderName="CompoundBorderUIResource"
        IsAPartOf="this">jCheckBox1.Border</BorderID>
    <TextID IsAPartOf="this">jCheckBox1.Text</TextID>
    <MarkIndicatorID Source="DefaultCheckBoxIcon"
        Shape="SmallSquare"
        IsAPartOf="this">jCheckBox1.MarkIndicator</MarkIndicatorID>
    <Shape>FilledRectangle</Shape>
    <IsAPartOf/>
    <BackGroundColor>
        <Red/><Green/><Blue/>
    </BackGroundColor>
    <IconTextGap/>
    <Visible/>
    <XSize/>
    <YSize/>
    <XPosition/>
    <YPosition/>
    </Class>
    <Class Name="Border" Inherits="Sub Element"
ID="jCheckBox1.Border">
    <Shape>OutlineOfRectangle</Shape>
    <BorderName>CompoundBorderUIResource</BorderName>
    <IsAPartOf>jCheckBox1</IsAPartOf>
    <Visible></Visible>
    <XSize></XSize>
    <YSize></YSize>
    ...
    </Class>
    <Class Name="Text" Inherits="Sub Element" ID="jCheckBox1.Text">
        <TextString/>
        <IsAPartOf>jCheckBox1</IsAPartOf>
    ...
    </Class>
    <Class Name="MarkIndicator" Inherits="Sub Element"
        ID="jCheckBox1.MarkIndicator">
    <ImageID IsAPartOf=
    "this">jCheckBox1.MarkIndicator.Image</ImageID>
    <IsAPartOf>jCheckBox1</IsAPartOf>
    ...
    </Class>
    <Class Name="Image" Inherits="Sub Element"
        ID="jCheckBox1.MarkIndicator.Image">
                    <Source>DefaultCheckBoxIcon</Source>
                    <IsAPartOf>
                    jCheckBox1.MarkIndicator</IsAPartOf>
                    ...
    </Class>
```

Note that the class Border (ID="jCheckBox1.Border") for the JCheckBox is currently defined as the default border "CompoundBorderUIResource". Later it will be seen that this default BorderName will be overwritten by the developer modification to the border type property.

DisplayRepresentationBuilder may utilize the mapping found in a Property-Mapper to capture values within Dynamic-Display-Representation and store them in the frame structure. The following is an example of a mapping that may be found in a Property-Mapper:

```
<maps os = "xp">
    ...
    <property defaultValue = "4" mapTo = "IconTextGap">
        javax.swing.AbstractButton/default/iconTextGap
    </property>
    ...
    <property defaultValue = "0" mapTo = "@BorderID#XSize">
        Details/border/width
    </property>
    ...
    <property defaultValue = "0" mapTo = "@BorderID#YSize">
        Details/border/height
    </property>
</maps>
```

Using IconTextGap as an example, it can be seen from the Property-Mapper example above that this property value (i.e., IconTextGap) is located at javax.swing.AbstractButton/default/iconTextGap which is relative to JCheckBox 42 in FIG. 12. The Property-Mapper may then provide the location within the frame structure where the value of IconTextGap should be stored. In this case, it is stored in the IconTextGap tag which is relative to the JCheckBox object at the top of the Current-Display-Representation below. After the frame structure is fully populated, it may then be saved in the file Current-Display-Representation as follows:

```
<Application>
    <!--||||||||||||||||||||||||||||| jCheckBox1 |||||||||||||||||||||||||||||-->
    <Object Name="javax.swing.JCheckBox" Inherits="GUI Element"
ID="jCheckBox1">
        <BorderID>jCheckBox1.Border</BorderID>
        <TextID>jCheckBox1.Text</TextID>
        <MarkIndicatorID>jCheckBox1.MarkIndicator</MarkIndicatorID>
        <Shape>FilledRectangle</Shape>
        <IsAPartOf/>
        <BackGroundColor>
            <Red>204</Red> <Green>255</Green> <Blue>0</Blue>
        </BackGroundColor>
        <IconTextGap>20</IconTextGap>
        <Visible>false</Visible>
        <XSize>123</XSize>
        <YSize>50</YSize>
        <XPosition>47</XPosition>
        <YPosition>35</YPosition>
    </Object>
    <Object Name="Border" Inherits=
"Sub Element" ID="jCheckBox1.Border">
        <BorderName>javax.swing.border.EtchedBorder</BorderName>
        <IsAPartOf>jCheckBox1</IsAPartOf>
        <Visible>true</Visible>
        <XSize>123</XSize>
        <YSize>50</YSize>
        ...
    </Object>
    <Object Name="Text" Inherits=
"Sub Element" ID="jCheckBox1.Text">
        <TextString>jCheckBox1</TextString>
        <IsAPartOf>jCheckBox1</IsAPartOf>
        ...
    </Object>
    <Object Name="MarkIndicator" Inherits="Sub Element"
ID="jCheckBox1.MarkIndicator">
        <ImageID>jCheckBox1.MarkIndicator.Image</ImageID>
        <IsAPartOf>jCheckBox1</IsAPartOf>
        ...
    </Object>
    <Object Name="Image" Inherits="Sub Element"
ID="jCheckBox1.MarkIndicator.Image">
        <Source>DefaultCheckBoxIcon</Source>
        <IsAPartOf>jCheckBox1.MarkIndicator</IsAPartOf>
        ...
    </Object>
</Application>
```

FIG. 13 shows the expansion of the details generated by the Component-Detailer for JCheckBox. For the border property, it can be seen that the detailer has determined that the JCheckBox border is visible and has a height of 50 and width of 123. In the Property-Mapper above, the height value located at Details/border/height relative to JCheckBox 42 is mapped into the frame structure using the syntax @BorderID#YSize. The @BorderID indicates that the destination for the property value is a reference defined by the value of BorderID. In this case, the value is jCheckBox1.Border. The height value of 50 is then stored in jCheckBox1.Border#YSize which is the YSize tag under the object with identity (ID=jCheckBox1.Border). This special mapping syntax may facilitate the mapping of properties for the sub-elements such as the modified border type EtchedBorder.

Figure 14:
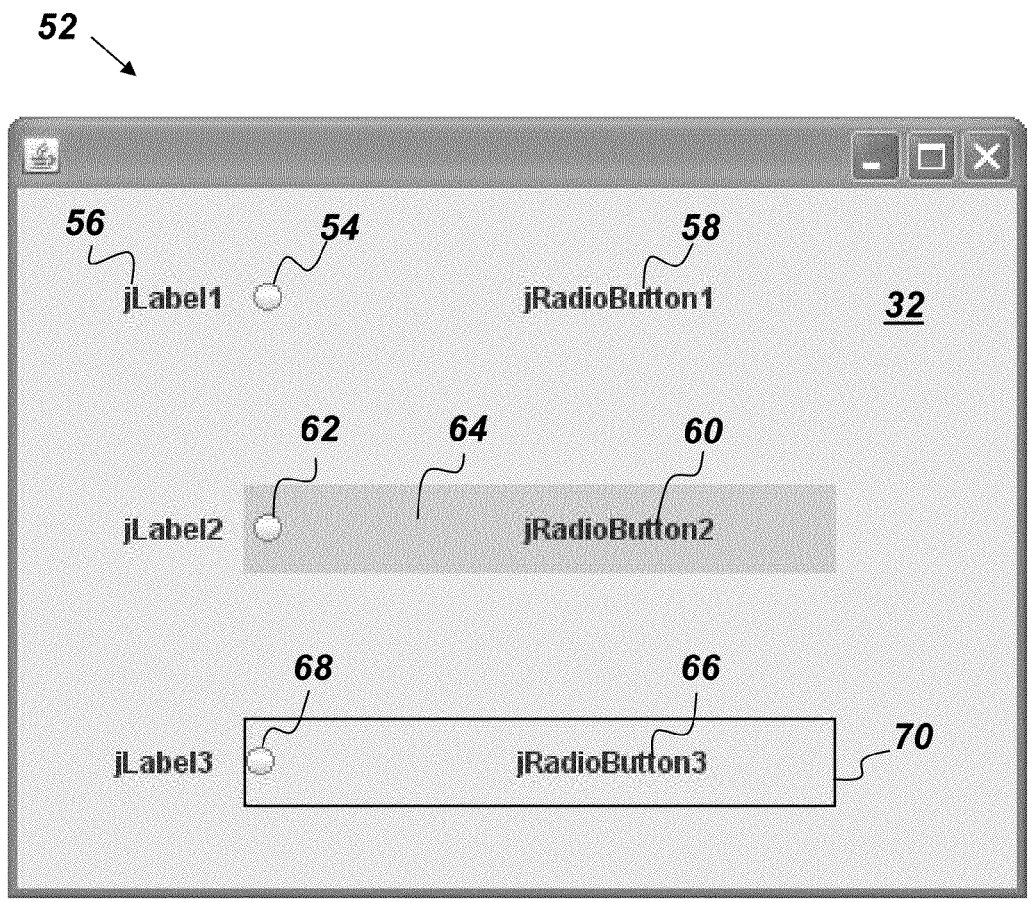
FIG. 14 is a screen-shot of a GUI.

FIG. 14 depicts an embodiment of a prototype GUI 52 displaying three rows of visible GUI sub-elements. The top row of sub-elements would be grouped according to spatial proximity by the GUI analysis method 20 in a manner that conflicts with Ground Truth where the small circle 54 groups with jLabel1 56 as opposed to jRadioButton1 58. Regarding the middle row of sub-elements, because the text "jRadioButton2" 60 and the small circle 62 share a common background color 64 that is perceptually distinct from the color of the panel 32, the GUI analysis method 20 groups them together as sub-elements of a single GUI element. Regarding the bottom row of sub-elements shown in FIG. 14, because the text "jRadioButton3" 66 and the small circle 68 share a common border 70, they group together as sub-elements of a single GUI element.

The GUI analysis method 20 may be used to group the sub-elements in a manner similar to how the visual system of a human observer would group them. As stated above, the perceptual grouping of elements may not coincide with Ground Truth. This problem is depicted in FIG. 14 where, according to the Ground Truth, each of the three rows of the prototype GUI 52 is composed of two GUI elements, a radio button and a label. In the top row, neither GUI element has a visible background or a visible border. The radio button is composed of two sub-elements: an icon that is a small empty circle 54 (we refer to this icon as a mark indicator), and text, "jRadioButton1" identified by reference character 58. The label is composed of just a text sub-element, "jLabel1" indicated by reference character 56. The question is, which of the two text sub-elements does the mark indicator belong with, jRadioButton1 58 or jLabel1 56? Visually, jLabel1 56 groups with the mark indicator 54 because of their close proximity. In the middle example, i.e., the sub-elements shown in the middle row of FIG. 14, there is an added background color to the radio button and in the bottom example, i.e., the sub-elements shown in the bottom row of FIG. 14, there is an added border to the radio button to reveal the Ground Truth. According to the Ground Truth, the mark indicator (i.e., circle 54) belongs with the text "jRadioButton1" not "jLabel1."

This simple example, shown in FIG. 14 and described above, reveals several important factors that may be taken into consideration for the visual grouping of GUI sub-elements:

1) One cannot rely on the Ground Truth grouping but should compute the perceptual grouping independent of what one knows from the Ground Truth representation of GUI sub-elements.

2) The example prototype GUI shown in FIG. 14 shows that the grouping of sub-elements should take into account the visibility of borders and the visibility of a background color. Thus in the middle row, the common background color groups the mark indicator with the text "jRadioButton2," and in the lower example, the border groups the corresponding two sub-elements. In the absence of borders and background colors, as in the top example, all sub-elements that share a common background should be grouped according to spatial proximity.

The GUI analysis method 20 may further comprise the further step of taking as an input the rectangles surrounding each GUI sub-element that have been outputted to the Dynamic-Display-Representation file and grouping these rectangles; taking into account perceptual grouping factors specified in an XML file, Grouping-Properties. The aforementioned step could be performed by a JAVA® program named AnalyzeDisplay. The perceptual grouping factors comprise: 1) surrounding borders, 2) surrounding background colors, and 3) spatial proximity. All rectangles that share a common, (uniform) background are grouped by spatial proximity. The objective of the grouping algorithm in AnalyzeDisplay is to group sub-elements along the lines of GUI elements. Since smaller groups are often nested inside larger grouping, one may specify the level of grouping the algorithm intends to capture. Thus the function of this grouping algorithm is to produce collections of GUI sub-elements that are perceived to be a part of the same GUI element. These groups of GUI sub-elements may be passed to an identification algorithm that will recognize a GUI element based on these GUI sub-elements.

The grouping algorithm first determines which of the rectangles in the Dynamic-Display-Representation file are "containers," that is, rectangles that contain other rectangles. The prototype GUI's frame is the largest container. Other containers may be rectangles that capture the position of perceived "panels," "borders," and "background colors." (Note the visibility of these sub-elements has been determined in the TADA converter detailer).

Figure 15A:
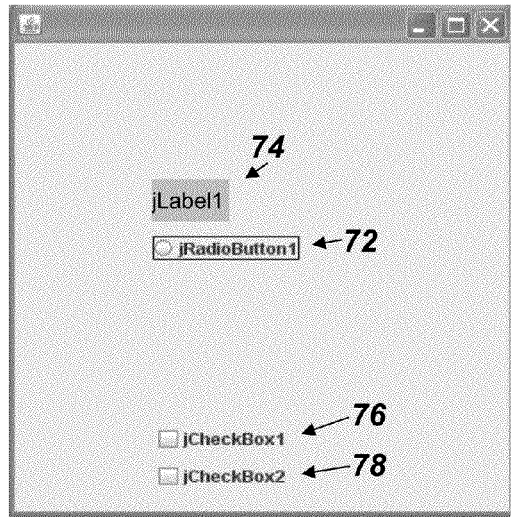
FIGS. 15A-15D are GUI screen-shots.
Figure 15B:
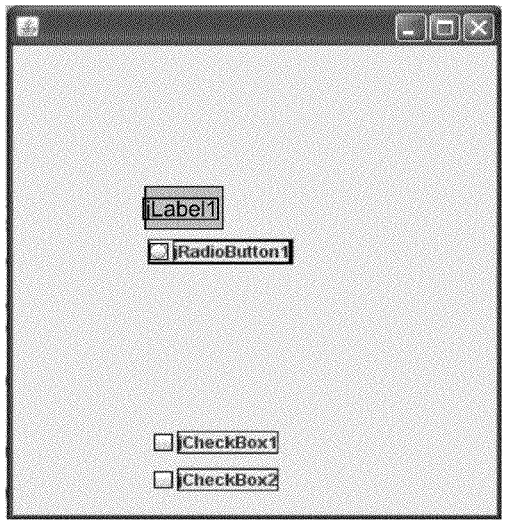
Figure 15C:
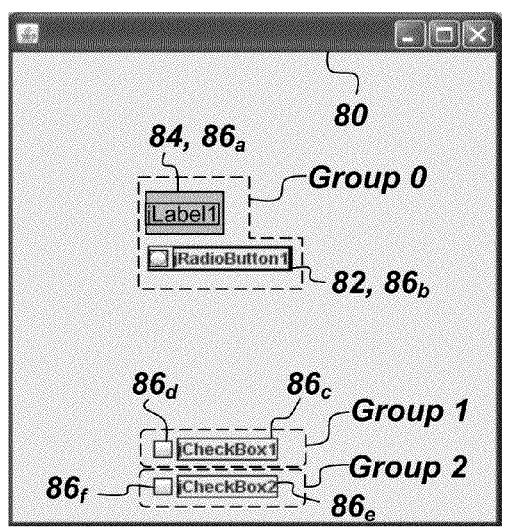

FIGS. 15A through 15D illustrate another example embodiment of the GUI analysis method 20. FIG. 15A is a representation of a prototype GUI, wherein the ground truth of the prototype GUI is comprised of the following GUI elements: jRadioButton1 72, jLabel1 74, jCheckBox1 76, and jCheckBox2 78. FIG. 15B shows the output of the Detailer, which captures the positions of all the visible sub-elements and places rectangles around them. FIG. 15C shows an intermediate stage of the grouping algorithm where rectangles that are in the same container by spatial proximity are grouped together. Besides a frame 80, there are two container rectangles, the rectangle 82 associated with the border sub-element of jRadioButton1 72, and the rectangle 84 associated with the background color sub-element of jLabel1 74. Starting with the largest container, which is the frame 80, the grouping algorithm groups the immediate children of that container by spatial proximity. In this case the immediate children are children rectangles $86_a$-$86_f$, which are respectively associated with the following sub-elements: Border of jLabel1 74, Background color of jRadioButton1 72, Text of jCheckBox1 76, Mark indicator of jCheckBox1 76, Text of jCheckBox2 78, and Mark indicator of jCheckBox2 78. All other rectangles are ignored since they are not immediate children of the container under consideration.

To group sub-elements by spatial proximity a Delaunay Reduced Graph (RDG) algorithm may be used. The RDG algorithm is described in a paper by Papari et al. entitled "Algorithm that Mimics Human Perceptual Grouping of Dot Patterns," which is incorporated by reference herein in its entirety. The RDG algorithm may be adapted for use by the GUI analysis method 20 by computing the shortest distance between all pairs of sub-element rectangles, as opposed to points. For a given pair of rectangles, (p, q), the distance between them, d(p,q) is normalized by their minimum distant to other rectangles as given by the equation:

$$\xi(p, q) = \frac{d(p, q)}{\min_{x \in S} \{d(p, x)\}} = r_1(e) \quad (5)$$

$$\xi(q, p) = \frac{d(p, q)}{\min_{x \in S} \{d(q, x)\}} = r_2(e) \quad (6)$$

Where x is any rectangle in the set of rectangles, S, being considered. In general the ratios, $r_1(e)$ and $r_2(e)$, are not equal since their denominators are not equal. That is, the minimum distance between p and all other rectangles may not be equal to the minimum distance of q and all other rectangles. The geometric average, $r_{(p,q)}(e)$, of these distances is computed:

$$r_{(p,q)}(e) = \sqrt{r_1(e) \cdot r_2(e)} \quad (7)$$

A threshold $r_t$ is then set. All rectangles whose distance, $r_{(p,q)}(e)$ is less than the threshold, are considered connected. A group of rectangles is comprised of connected rectangles. A few remarks about this algorithm are in order: 1) The minimum value of $r_{(p,q)}(e)$ is 1.0. 2) If there are only two rectangles in the field, x and y, then $r_{(x,y)}(e)=1.0$; thus these rectangles will group together, regardless of their absolute distance, if the threshold value, $r_t$, is set greater than 1.0. In our cases the threshold for grouping was set to 1.1.

Figure 15D:
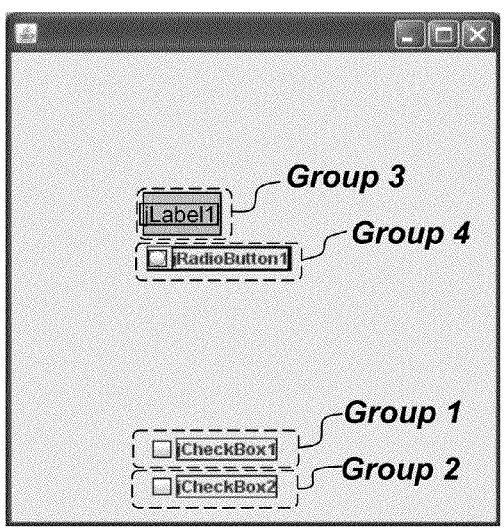

FIG. 15C shows the grouping at this stage in the algorithm. The text and mark indicators of jCheckbox1 76 and jCheckbox2 78 have formed groups 1 and 2, respectively. Note that the rectangles associated with the border of jRadioButton1 and the background-color of jLabel1 have also grouped to form group 0. In a recursive manner, the algorithm finds the next level of containers and within each container, groups the immediate children by spatial proximity (implementing the RDG algorithm). Referring to FIG. 15C, the next level of containers includes the rectangle associated with the border of jRadioButton1 72 and the rectangle associated with the background-color of jLabel1 74. Thus within these containers the immediate children would be grouped by spatial proximity. This process continues until no more containers are found. At this point a decision is made as to whether or not the "smallest" and most immediate container rectangle should group with its interior rectangles. If the number of groups inside the rectangle is one, then the container is deleted from any previous group it may have belonged to and added to the interior group of rectangles. In our current example, there are no containers inside either the jRadioButton1 72 border or the jLabel1 74 background-color. Each of these containers holds only one group: The jLabel1 74 background-color holds only group 3, which consists of text (see FIG. 15D). The jRadioButton1 72 holds only group 4, which consists of a mark indicator and text. Thus the rectangle 84 associated with the background color sub-element of jLabel1 74 would be deleted from group 0 and added to group 3. Likewise, the rectangle 82 associated with the border sub-element of jRadioButton1 72 would be deleted from group 0 and added to group 4. In FIG. 15D, the final output of the algorithm is depicted. The algorithm has found four groups of GUI sub-elements groups 1-4. The GUI analysis method 20 assumes the sub-elements of each group are a part of a single perceived GUI element. These perceived GUI elements can now be passed to a "recognizer" for the purpose of identification. Note, for convenience in the above discussion, we referred to these GUI sub-elements as parts of their Ground Truth GUI elements: jRadioButtons1, jLabel1, jCheckBox1, jCheckBox2. In fact, perceptually the GUI analysis method 20 has yet to identify any of these four perceived GUI elements.

Figure 16A:
FIGS. 16A-16C are GUI screen-shots.
Figure 16B:
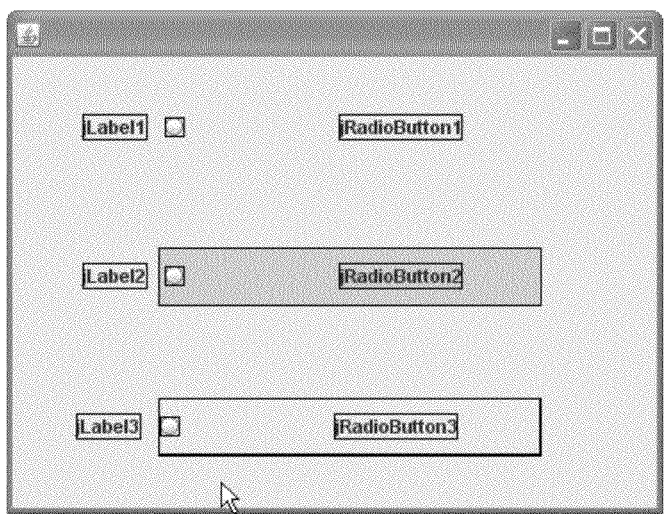
Figure 16C:
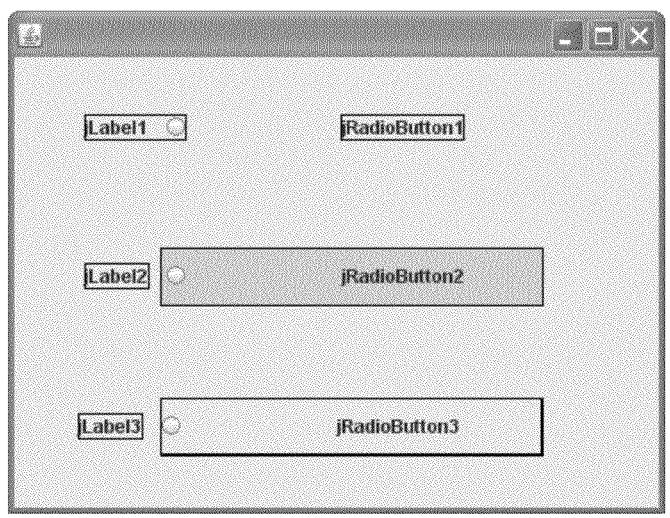

FIGS. 16A-16C demonstrate how the GUI analysis method 20 takes an initial prototype GUI, such as is shown in FIG. 16A, finds the sub-element geometry of the prototype GUI, such as is shown in FIG. 16B, and then groups the sub-elements, as shown in FIG. 16C. FIG. 16B shows how the GUI analysis method 20 circumscribes each sub-element on the prototype GUI with a rectangle. FIG. 16C shows how the GUI analysis method groups the sub-elements identified in FIG. 16B into perceived GUI elements, with each perceived GUI element being surrounded by a corresponding rectangle. Specifically, FIG. 16C shows the topmost mark indicator grouped with the text "jLabel1" due to spatial proximity, but the middle mark indicator is shown grouped with the text "jRadioButton2" since they share a common background, distinct from the frame. The bottom mark indicator is shown as grouped with the text 'JRadioButton3" since both are surrounded by a common border.

Figure 17A:
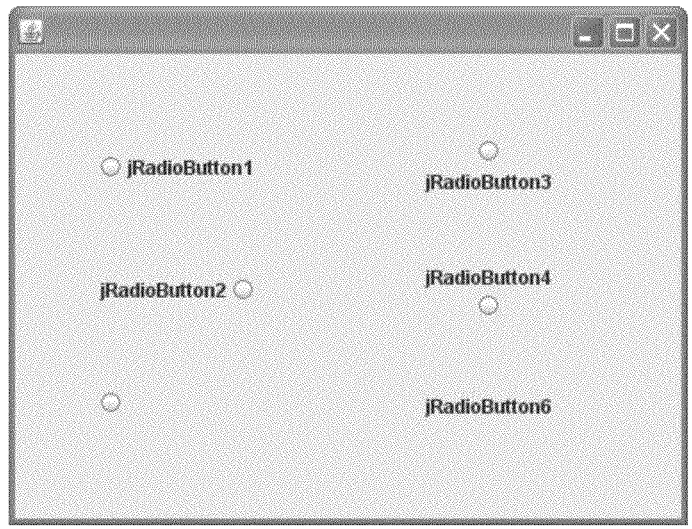
FIGS. 17A-17C are GUI screen-shots.
Figure 17B:
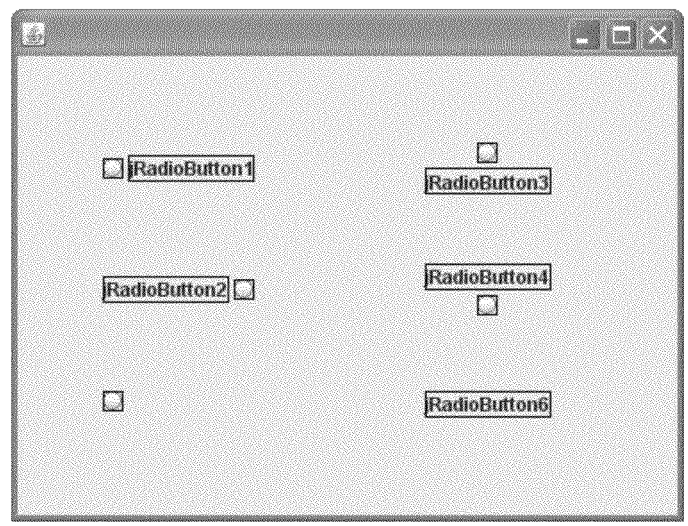
Figure 17C:
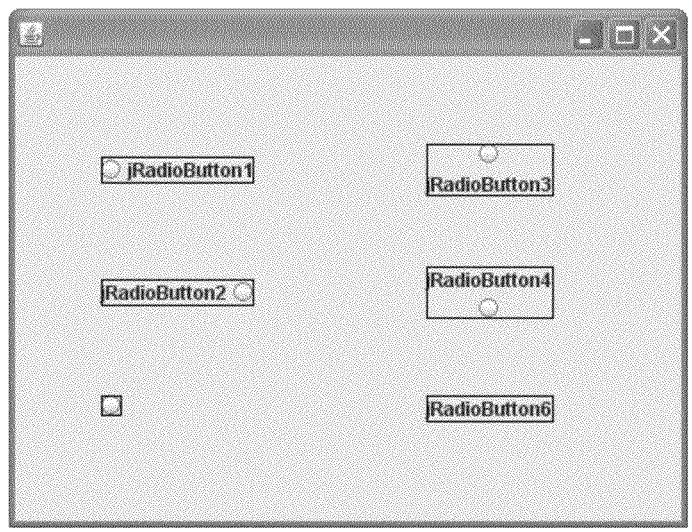

FIGS. 17A-17C illustrate how the GUI analysis method 20 takes into consideration varying internal geometry of radio buttons. FIG. 17A shows an embodiment of a prototype GUI. In FIG. 17B the GUI sub-elements are depicted by placing rectangles around them and in FIG. 17C the output of the grouping algorithm is demonstrated by placing rectangles around each group, or perceived GUI element. Note that the bottom mark indicator is an example of a JRadioButton that does not have visible text. This lone mark indicator, jRadioButton5, does not group with the text "jRadioButton6"; rather, the two are perceived to be distinct GUI elements by the GUI analysis method 20, which, in this case, matches the ground truth. If a GUI element has both a background color and a border then the rectangles circumscribing those two sub-elements would be equal to one another so that it suffices to only use one, the border or the background, in the grouping algorithm and treat them as equivalent. Thus whatever groups with the border also groups with the background color.

The GUI analysis method 20 transforms a prototype GUI into a perceptual representation of visual attributes of GUI elements and their sub-elements that represents what a user sees when looking at the display. This representation includes a Where/With grouping of sub-elements. That is, the GUI analysis method determines where the sub-elements are located and which sub-elements group with other sub-elements to create perceived GUI elements. The next step is for the GUI analysis method 20 to identify each perceived GUI element. This may be accomplished by comparing each perceived GUI element to a listing of generic GUI elements.

Such a listing of generic GUI elements is a perceptual and procedural representation of GUI elements that could be likened unto a user's Long Term Memory (LTM). Any identification algorithm may be used to identify the perceived GUI elements. A suitable example of an identification algorithm includes, but is not limited to, a widget identification tree such as is described in Ross Quinlan's paper "Induction of Decision Trees," which is incorporated by reference herein, and which describes an Iterative Dichotomiser 3 (ID3) algorithm which is based on entropy and minimizes disorder in creating a search tree. The ID3 algorithm has the capability of being converted into If/Then Identity rules. These rules may be used to specify the identification of each perceived GUI element. Other suitable examples of the identification algorithm include the identification algorithms described in Stephen Garner's paper, "WEKA, The Waikato Environment for Knowledge Analysis," which is incorporated by reference herein. The WEKA algorithms have several advantages. Foremost, any analysis performed in the WEKA environment is available as a JAR (JAVA® Archive) file and can be imported into the NetBeans® environment.

The following is a discussion of how the WEKA algorithms may be incorporated into the GUI analysis method 20. First, in the JAVA® program, IdentifyWidgets, one may build into the GUI analysis method 20 the capability to build an identification model. Second, once a model is built it may be used to determine the identification of GUI elements on an arbitrary interface. Thus, one may build a formal representation of the visual attributes of interface elements that, when trained, allows the GUI analysis method to identify perceived GUI elements. This representation exemplifies a user's perception of GUI elements. The GUI analysis method 20 may further comprise the step of learning to identify a set of GUI elements, by allowing an operator to build a training set of elements within the IDE environment and create an identification model. This model represents a user's knowledge of how GUI elements should look and may then be used to identify GUI elements in new interfaces. The model may be re-trained at any time.

Figure 18A:
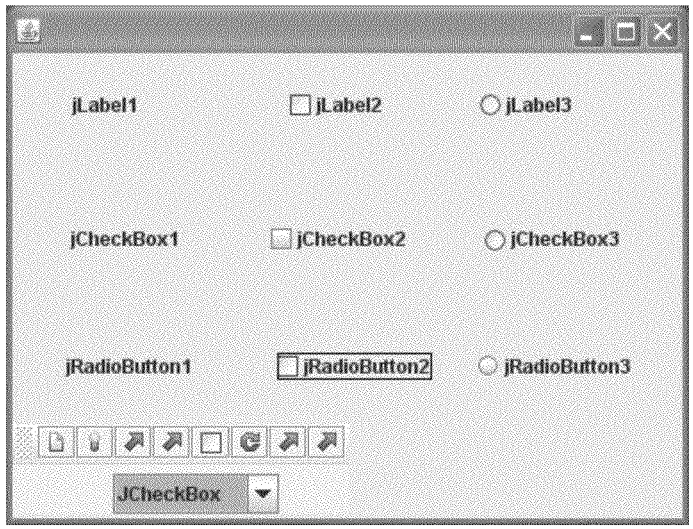
FIGS. 18A-18C are GUI screen-shots.
Figure 18B:
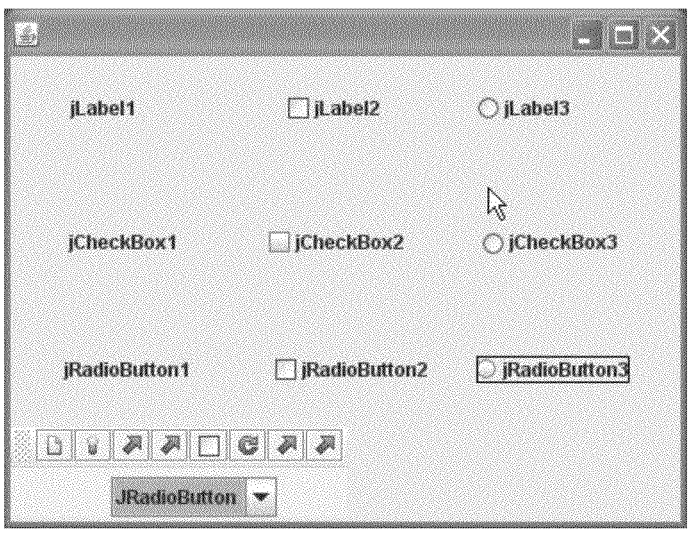
Figure 18C:
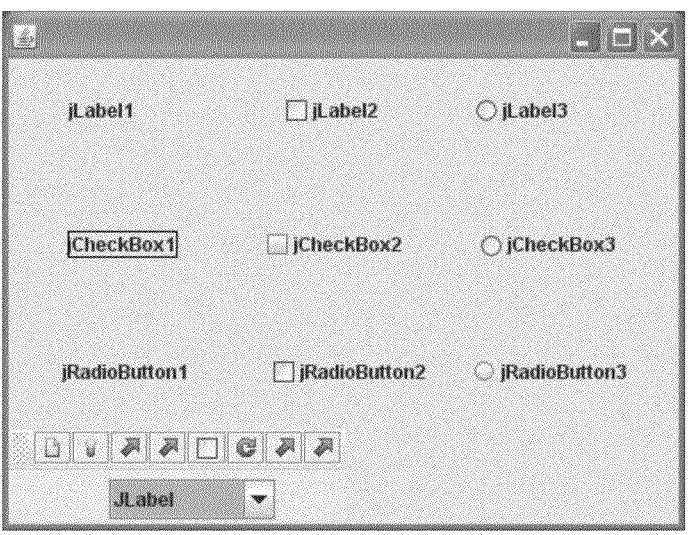

FIGS. 18A-18C, for example, represent a set of GUI training elements. For each element in the display, the operator can select the perceived identification of the element. In FIGS. 18A, 18B, and 18C respectively, the operator identifies (via the drop-down menu shown on the bottom left of each figure) a checkbox, a radio button, and a label. The ground truth, however, in each of FIGS. 18A, 18B, and 18C respectively identifies the selected element as a radio button, a radio button, and a checkbox.). The training data is then fed to the identification algorithm and an identification model may be built. In FIG. 18A, the rectangle around "jRadioButton2" signifies that it has been selected to determine its perceived identity. From the pull down menu the operator has identified the selected widget as a checkbox, thus there is a difference between Ground Truth and the Perceptual identification of the GUI elements in FIG. 18A. In FIG. 18B, the selected GUI element, jRadioButton3, has been identified as a radio button by the user. Thus, the Ground Truth and the perceptual representation coincide in FIG. 18B. In FIG. 18C, the selected GUI element, "jCheckBox1" is identified as a label by the user. FIG. 18C is another example of where the Ground Truth and perceptual representations do not match.

FIG. 19 is an example output of an ID3 algorithm, or training model, that may be used to identify perceived GUI elements. The model may be used to identify GUI elements in arbitrary interface displays. Once a perceived GUI element has been identified the perceived identification of GUI elements can then be compared to ground truth. When passed to TADA's how analysis, TADA would expect these elements to behaved as they were identified by the model (i.e., according to their perceived identity) not necessarily in accordance with the ground truth. Thus if a widget looked like a check box and behaved like a checkbox, it would not matter if the widget was actually a label according to Ground Truth. However, if it looked like a check box but behaved like a label then this discrepancy would be brought to the designer's attention.

Once a perceived GUI element has been identified by the What Analysis, a series of actions associated with the perceived GUI element may be stored in the second memory store 16. Thus, after a match is made regarding a perceived GUI element's identity, the GUI analysis method 20 may generate a set of general predictions, representing the user's procedural knowledge of GUI elements that determines how the user believes the prototype GUI should behave when the perceived GUI elements are manipulated. The GUI analysis method 20 may be used to test this expected behavior against ground truth and flag mismatches. In this manner the GUI analysis method 20 performs a "How" analysis. In other words, the How analysis answers the question, "Does the prototype GUI element behave how a user would expect the prototype GUI element should behave?" To do this testing, the GUI analysis method 20 may implement a JAVA® class that automates mouse and keyboard actions that then manipulates the JAVA® object and regenerates CurrentDisplay.xml. Thus, all that is necessary to determine perceived GUI element behavior after a given perceived GUI element has been virtually acted upon, is to compare the run time object prior to the action to the run time object after the action has taken place. In this manner the GUI analysis method 20 may perform an experiment to determine if predicted changes in the run time object match the actual changes in the runtime object.

Figure 20:
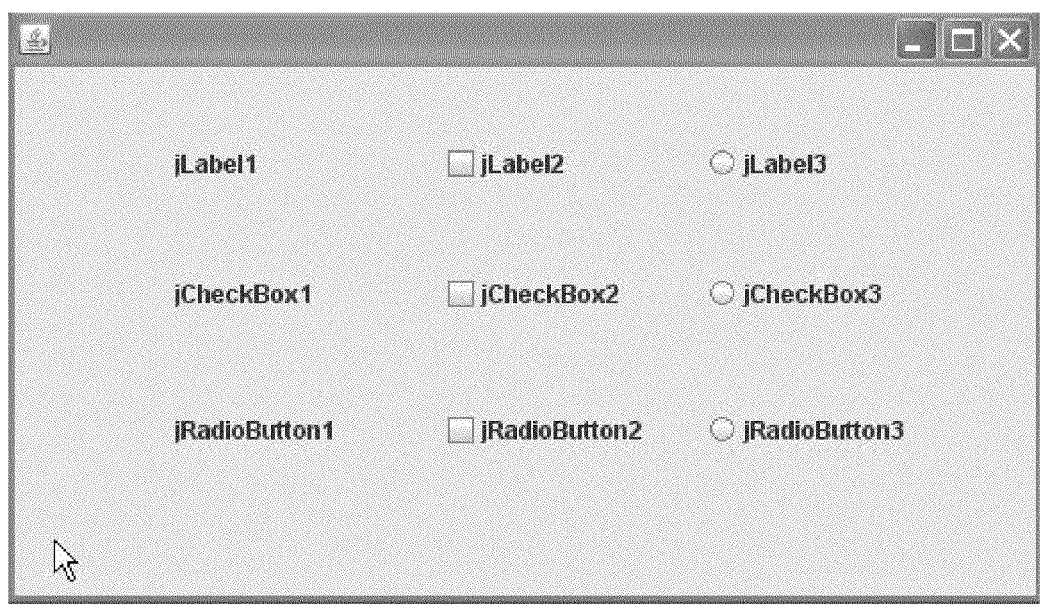
FIG. 20 is a screen-shot of a GUI.

FIG. 20 is a screen shot of a prototype GUI showing numerous GUI elements. The text shown in this figure represents the Ground Truth Representation. After the GUI analysis method 20 identifies the perceived GUI elements the perceived identities may differ from the Ground Truth. Table 1 below compares the Ground Truth representation of the GUI elements shown in FIG. 20 with the perceived identities of the GUI elements in FIG. 20 generated by the GUI analysis method 20. Any instances where the Ground Truth representation does not match the perceived identity of the GUI element may be flagged as an instance where a user would be confused by the prototype GUI.

TABLE 1

Ground Truth representation of GUI elements displayed on a prototype GUI alongside perceived identities of the GUI elements.

| Ground Truth Representation | Perceived Identities of GUI elements |
| --- | --- |
| jLabel1 | JLabel |
| jLabel2 | JCheckBox |
| jLabel3 | JRadioButton |
| jCheckBox1 | JLabel |
| jCheckBox2 | JCheckBox |
| jCheckBox3 | JRadioButton |
| jRadioButton1 | JLabel |
| jRadioButton2 | JCheckBox |
| jRadioButton3 | JRadioButton |

FIG. 21 is a flowchart depicting the steps of the first sub-analysis 22 of GUI analysis method 20. The first step 22a provides for receiving, with a processor, a computer code representative of the prototype GUI, wherein the prototype GUI comprises GUI elements having known identities and known behavioral attributes. The next step 22b provides for transforming the computer code into a description of visible sub-elements of the prototype GUI elements, wherein each sub-element has visual properties that would be visible to a user of the prototype GUI. The next step 22c provides for grouping particular visible sub-elements into a perceived GUI element based only on the sub-elements' visual properties according to a grouping algorithm without regard to the known identity(ies) of the prototype GUI element(s) to which the particular sub-elements belong. The next step 22d provides for storing, in a non-transitory first memory store, the perceived GUI element.

Figure 22A:
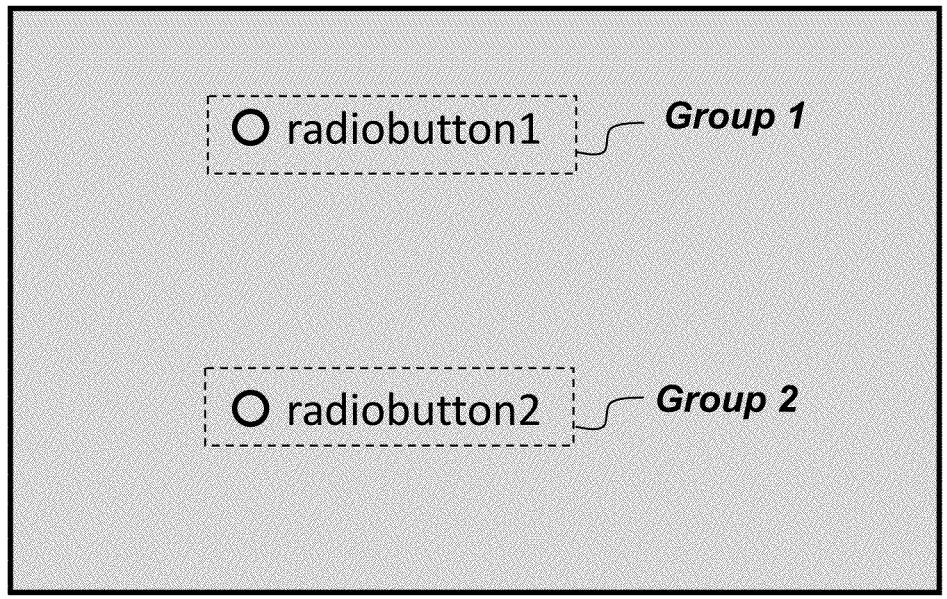
FIGS. 22A-22B are screen-shots of a GUI.
Figure 22B:
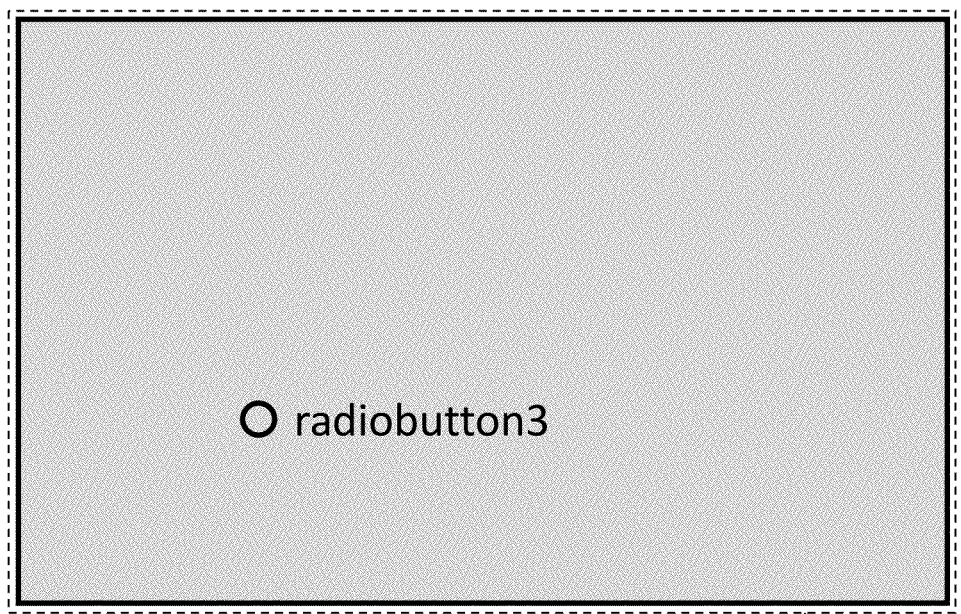

FIGS. 22A-22B illustrate how the GUI analysis method 20 may determine whether or not a given border or background color should be grouped with a group of sub-elements contained within the given border or background color. The GUI analysis method 20 may be used to look for containers that contain sub-elements or groups of sub-elements. Several sub-elements within a border or common background do not necessarily all group together. Inside a border or a background there may be several groups. The question arises of whether or not the border or background color of the container is part of one of the groups. If there is more than one group of sub-elements inside a given container then neither the container's background color nor its border get grouped with any of the groups inside the given container. If there is only one group inside the container then the container's background color and/or border gets grouped with the single sub-element group it contains. For example, in FIG. 22A, the GUI analysis method 20 would identify two groups of sub-elements, Group 1 and Group 2. Group 1 is associated with radiobutton1. Group 2 is associated with radiobutton2. Because the grouping algorithm will eventually find two groups inside the container, neither the container's border nor its background color will group with radiobutton1 or radiobutton2. Regarding FIG. 22B, the GUI analysis method 20 would only identify one group of sub-elements within the container (i.e., those sub-elements associated with radiobutton3. Because the algorithm will eventually find just one group inside the container, the border and the background color of the container will group with radiobutton1 as a single group, Group 3.

Figure 23:
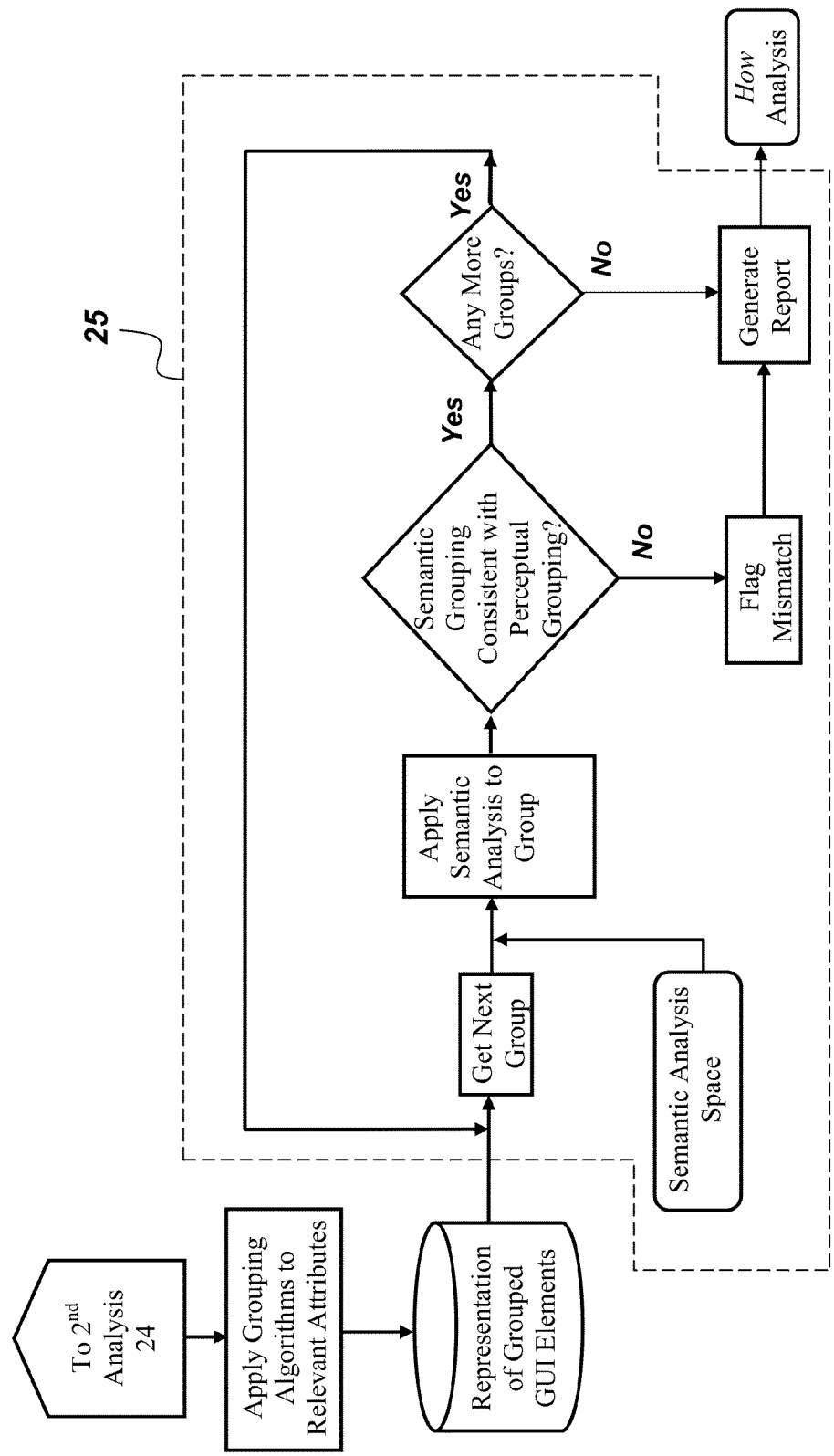
FIG. 23 is a flowchart showing details of a Semantic Analysis.

FIG. 23 is a flowchart showing further details of an embodiment of the Semantic Analysis 25. In this embodiment of a higher level grouping analysis, another grouping algorithm is applied to relevant attributes of the perceived GUI elements which have been determined by the second analysis 24. The relevant attributes may include but are not limited to spatial proximity of GUI elements, discrete sets of GUI elements within tabbed pages, sub-regions separated by panel borders, and related functionality. The resulting sets of grouped GUI elements may be analyzed based on a custom Semantic Analysis Space. For each group, it may be determined whether the perceptual grouping is consistent with a semantic grouping based on the semantics of any text, images, or functionality. Inconsistent results may then be flagged in order to generate a report for the developer.

From the above description of the GUI analysis method 20, it is manifest that various techniques may be used for implementing the concepts of the invention without departing from its scope. The described embodiments are to be considered in all respects as illustrative and not restrictive. It should also be understood that the claimed invention is not limited to the particular embodiments described herein, but is capable of many embodiments without departing from the scope of the claims.

We claim:

1. A graphical user interface (GUI) analysis method, performed by a processor configured with stored instructions, the method comprising the following steps:

receiving, computer code representative of a prototype GUI from a developer, wherein the prototype GUI comprises actual GUI elements having known identities and known behavioral attributes, wherein the processor is operatively coupled to first and second non-transitory memory stores, wherein the second memory store comprises a list of generic GUI elements and the visual and behavioral properties corresponding to each generic GUI element;

transforming a runtime object into an Extensible Markup Language (XML) data structure that captures dynamic properties of the run time object, including a description of the visual properties of the actual GUI elements and sub-elements that make up the prototype GUI, wherein each sub-element has visual properties that would be visible to a user of the prototype GUI;

grouping the sub-elements into perceived GUI elements based only on the visual properties of the sub-elements and storing the perceived GUI elements in the first memory store;

flagging instances where a perceived GUI element includes sub-elements from more than one actual GUI element;

comparing each perceived GUI element to the list of generic GUI elements to find the closest match, the closest match determined by the developer;

assigning the identity of the closest-matched generic GUI element to the perceived GUI element;

flagging instances where the assigned identity of the perceived GUI element does not match the known identity of the actual GUI element;

predicting a behavioral response of the perceived GUI element to an action based on a behavioral response associated with the assigned identity;

virtually performing the action on the prototype GUI;

comparing the run time object prior to performance of the action to the run time object after performance of the action to determine an actual action-response;

comparing the predicted, behavioral action-response to the actual action-response;

flagging instances where the behavioral action-response does not match the actual action- response; and generating and producing a report of the flagged instances for the developer.

2. The method of claim 1, wherein the grouping step is performed according to a grouping algorithm without regard to the known identity(ies) of the actual GUI element(s) to which the particular sub-elements belong.

3. The method of claim 2, wherein, during the grouping step, each visible sub-element is circumscribed by a rectangle.

4. The method of claim 3, wherein, the grouping step further comprises:

identifying containers in the prototype GUI, wherein each container has a border and a background color and each container contains at least one GUI sub-element;

grouping the visible sub-elements according to the spatial proximity of rectangles of the sub- elements; and grouping a given group and a given container into a single group if the given group is the only group of visible sub-elements within the given container.

5. The method of claim 4, wherein the grouping together according to the spatial proximity of their respective rectangles is performed with a Delaunay Reduced Graph (RDG) algorithm.

6. The method of claim 5, wherein all the steps are performed without the use of the source code of the prototype GUI.

7. The method of claim 6, wherein a background color is considered visible if it has a Luminance contrast ratio greater than a given Luminance contrast ratio threshold.

8. method of claim 7, further comprising:

grouping the perceived GUI elements into a higher level set of groupings based upon perceptual attributes of the prototype GUI; and performing a semantic analysis on each higher level group to determine whether or not semantic information of a given higher level group is consistent with the given higher level group's constituent perceived GUI elements.

* * * * *